(12) United States Patent
Yamamoto et al.

(10) Patent No.: US 6,850,157 B1
(45) Date of Patent: Feb. 1, 2005

(54) WIRELESS DATA ACQUISITION SYSTEM

(75) Inventors: Masahiro Yamamoto, Yamatokoriyama (JP); Masafumi Nakagawa, Nara (JP); Katsunori Tanie, Moriguchi (JP); Shinichi Nakane, Yamatokoriyama (JP); Jyunichi Saito, Soraku-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 54 days.

(21) Appl. No.: 10/019,851

(22) PCT Filed: Oct. 18, 2000

(86) PCT No.: PCT/JP00/07254

§ 371 (c)(1),
(2), (4) Date: Nov. 7, 2001

(87) PCT Pub. No.: WO01/99299

PCT Pub. Date: Dec. 27, 2001

(51) Int. Cl.[7] ................................................. G08B 1/08
(52) U.S. Cl. ............................... 340/539.1; 340/10.51; 340/3.1; 340/870.02; 340/870.03; 340/870.11
(58) Field of Search .......................... 340/539.1, 10.51, 340/3.1, 870.02, 870.03, 870.07, 870.11, 870.7; 455/404

(56) References Cited

U.S. PATENT DOCUMENTS

| | | | | |
|---|---|---|---|---|
| 4,803,632 A | * | 2/1989 | Frew et al. ............ | 340/870.02 |
| 5,381,136 A | * | 1/1995 | Powers et al. ............... | 340/539 |
| 5,808,558 A | * | 9/1998 | Meek et al. ........... | 340/870.01 |
| 5,940,074 A |   | 8/1999 | Britt, Jr. et al. | |
| 5,940,386 A |   | 8/1999 | Alger-Meunier et al. | |
| 6,054,920 A | * | 4/2000 | Smith et al. ................ | 340/539 |
| 6,069,571 A | * | 5/2000 | Tell ........................ | 340/870.02 |
| 6,124,806 A | * | 9/2000 | Cunningham et al. . | 340/870.02 |
| 6,295,461 B1 | * | 9/2001 | Palmer et al. .............. | 340/539 |

FOREIGN PATENT DOCUMENTS

| | | |
|---|---|---|
| JP | 4-37938 | 2/1992 |
| JP | 4-167139 | 6/1992 |
| JP | 5-197559 | 8/1993 |
| JP | 7-175662 | 7/1995 |
| JP | 7-200306 | 8/1995 |
| JP | 8-79395 | 3/1996 |
| JP | 9-180084 | 7/1997 |
| JP | 10-161951 | 6/1998 |
| JP | 11-225216 | 8/1999 |

* cited by examiner

Primary Examiner—Jeffery Hofsass
Assistant Examiner—Hung Nguyen
(74) Attorney, Agent, or Firm—Snell & Wilmer, LLP

(57) ABSTRACT

A wireless data collection system 1a includes a wireless terminal 2 provided for an apparatus 1, a wireless base station 5 for communicating with the wireless terminal 2 through a wireless communication to collect data on the apparatus 1, and a central station apparatus 10 for communicating with the wireless base station 5 through a line 9. The wireless base station 5 includes a control section 6 for controlling an operation of the wireless base station 5, an information obtaining section 7 for obtaining change information for changing an operation of the control section 6 from outside the wireless base station 5, and a rewriting section 8 for rewriting control information defining the operation of the control section 6 based on the change information.

14 Claims, 16 Drawing Sheets

WIRELESS DATA ACQUISITION SYSTEM

TECHNICAL FIELD

The present invention relates to a wireless data collection system for collecting various data on an apparatus through a wireless communication.

BACKGROUND ART

FIG. 16 shows a structure of a conventional wireless data collection system 100.

The wireless data collection system 100 includes a wireless terminal 102 provided for a gas hot water supply 101, a wireless terminal 104 provided for a gas cooking stove 103, a wireless base station 105 for communicating with the wireless terminals 102 and 104 through a wireless communication, and a central station apparatus 108 for communicating with the wireless base station 105 through a line 107 such as a telephone line.

The wireless base station 105 includes a control section 106 for controlling an operation of the wireless base station 105.

The central station apparatus 108 is managed by companies such as, for example, a gas supply company for collecting various data on the gas hot water supply 101 and the gas cooking stove 103.

The central station apparatus 108 sends an instruction to the wireless base station 105 through the line 107 to, for example, collect data indicating an operation state of the gas hot water supply 101 or data indicating an operation state of the gas cooking stove 103.

The wireless base station 105 sends an instruction from the central station apparatus 108 using a wireless communication.

The wireless terminal 102 obtains data indicating the operation state of the gas hot water supply 101 in response to a wireless signal from the wireless base station 105, and sends the obtained data to the wireless base station 105 through a wireless communication.

The wireless terminal 104 obtains data indicating the operation state of the gas cooking stove 103 in response to a wireless signal from the wireless base station 105, and sends the obtained data to the wireless base station 105 through a wireless communication.

Upon receiving the wireless signal from the wireless terminal 102 or 104, the wireless base station 105 sends contents of the wireless signal to the central station apparatus 108 through the line 107. The operation of the wireless base station 105 is controlled by the control section 106.

However, when the control section 106 for controlling the wireless base station 105 malfunctions or a change in specifications of the control section 106 is needed, the above-described conventional wireless data collection system 100 requires the wireless base station 105 or the control section 106 to be replaced with a new one.

The wireless base station 105 is not necessarily installed at a site where the wireless base station 105 or the control section 106 can be easily replaced or can be easily accessed. When the wireless base station 105 is installed at a site where the wireless base station 105 or the control section 106 cannot be easily replaced or cannot be easily accessed, the replacement of the wireless base station 105 or the control section 106 is difficult and costly.

Furthermore, with the conventional wireless data collection system 100, whenever a change in the specifications of the control section 106 is needed, the wireless base station 105 or the control section 106 are required to be replaced.

The present invention has an objective of providing a wireless data collection system for easily dealing with a malfunction and a change in the specifications of a control section.

DISCLOSURE OF THE INVENTION

A wireless data collection system according to the present invention includes a wireless terminal provided for an apparatus; a wireless base station for communicating with the wireless terminal through a wireless communication to collect data on the apparatus, and a central station apparatus for communicating with the wireless base station through a line. The wireless base station includes a control section for controlling an operation of the wireless base station, an information obtaining section for obtaining change information for changing an operation of the control section from outside the wireless base station, and a rewriting section for rewriting control information defining the operation of the control section based on the change information. Thus, the above-described objective is achieved.

The wireless base station may further include a signal detection section for detecting a signal indicating timing at which the information obtaining section is to obtain the change information, and the information obtaining section may start obtaining the change information in response to detection of the signal by the signal detection section.

The information obtaining section may obtain the change information from the central station apparatus.

The wireless base station may further include a rewriting amount determination section for determining whether the control information is to be rewritten partially or entirely based on the change information, and the rewriting section may rewrite the control information based on a determination result of the rewriting amount determination section.

The wireless base station may further include a storage section for temporarily storing the control information before the rewriting section rewrites the control information; and when the rewriting section fails in rewriting the control information, the control section may operate in accordance with the control information stored in the storage section.

The wireless base station may further include a notification section for notifying of a rewriting result of the control information to outside the wireless base station.

Another wireless data collection system according to the present invention includes a wireless terminal provided for an apparatus; a wireless base station for communicating with the wireless terminal through a wireless communication to collect data on the apparatus; and a central station apparatus for communicating with the wireless base station through a line. The wireless base station includes a control section for controlling an operation of the wireless base station, an information obtaining section for obtaining change information for changing an operation of the control section from outside the wireless base station, and a rewriting section. The control section includes a first control portion and a second control portion, and the rewriting section rewrites at least one of first control information defining an operation of the first control portion and second control information defining an operation of the second control portion, based on the change information. Thus, the above-described objective is achieved.

The wireless base station may further include a storage section for temporarily storing the change information obtained by the information obtaining section, and the rewriting section may rewrite the control information based on the change information only when the information obtaining section has successfully obtained the change information.

The wireless base station may further include a rewriting range determination section for determining whether only the first control information is to be rewritten, only the second control information is to be rewritten, or both of the first control information and the second control information are to be rewritten; and the rewriting section may rewrite at least one of the first control information and the second control information based on a determination result of the rewriting range determination section.

The wireless base station may further include an operation determination section for determining whether the wireless base station is to operate in accordance with the first control portion or the second control portion, and the wireless base station may operate in accordance with whichever of the first control portion and the second control portion determined by the operation determination section.

The wireless base station may further include a storage section for storing information indicating whether the wireless base station is in operation in accordance with the first control portion or the second control portion.

The wireless base station may further include a notification section for outputting a notification signal notifying of a rewriting result of the first control information and a rewriting result of the second control information.

The wireless base station may further include a normal operation monitoring section for starting counting of a timer upon receiving the notification signal output by the notification section and stopping the counting of the timer upon receiving a signal sent from the central station apparatus in response to the notification signal, and the rewriting section may return the operation of the control section to the operation before the change by the timer.

The control section may further include a third control portion for controlling minimum necessary communication between the wireless base station and the central station apparatus, and the wireless base station may further include a recovery section for detecting that neither the first control portion nor the second control portion operates normally based on information from the normal operation monitoring section, and switching the wireless base station to be controlled by the third control portion.

The wireless base station may further include a switching section for switching the wireless base station to be controlled by the third control portion in response to a signal from the central station apparatus.

BEST MODE FOR CARRYING OUT THE INVENTION

Hereinafter, the present invention will be described by way of examples with reference to drawings.

Example 1

Figure 1:
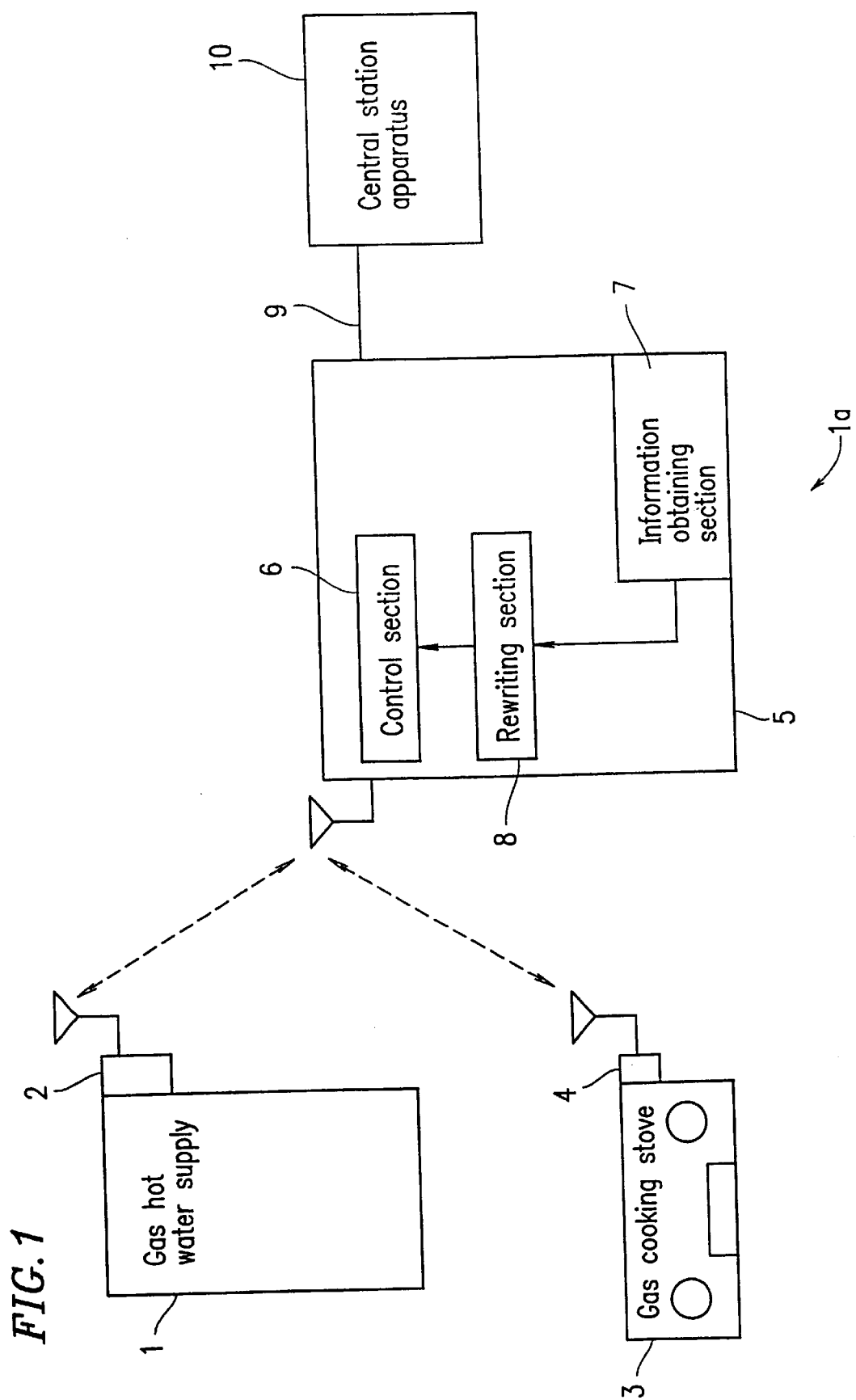
FIG. 1 is a block diagram showing a structure of a wireless data collection system $1a$ in a first example according to the present invention.

FIG. 1 shows a structure of a wireless data collection system $1a$ in a first example according to the present invention.

The wireless data collection system $1a$ includes a wireless terminal 2 provided for a gas hot water supply 1, a wireless terminal 4 provided for a gas cooking stove 3, a wireless base station 5 for communicating with the wireless terminals 2 and 4 through a wireless communication to collect data on the gas hot water supply 1 and the gas cooking stove 3, and a central station apparatus 10 for communicating with the wireless base station 5 through a line 9 such as, for example, a telephone line.

The gas hot water supply 1 is installed, for example, outside a house. The wireless terminal 2 may be attached to or built in the gas hot water supply 1.

The gas cooking stove 3 is installed, for example, inside the house. The wireless terminal 2 may be attached to or built in the gas cooking stove 3.

The wireless base station 5 includes a control section 6 for controlling an operation of the wireless base station 5, an information obtaining section 7 for obtaining change information for changing the operation of the control section 6 from outside the wireless base station 5, and a rewriting section 8 for rewriting information defining the operation of the control section 6 based on the change information obtained by the information obtaining section 7.

In the following description, the "information defining the operation of the control section 6" will be referred to as the "control information of the control section 6".

The control section 6 operates in accordance with the control information of the control section 6. Therefore, the operation of the control section 6 can be changed by rewriting the control information of the control section 6. The control information of the control section 6 is stored in, for example, a rewritable memory (not shown) in the control section 6.

The information obtaining section 7 may be attached to or built in the wireless base station 5.

The central station apparatus 10 is managed by, for example, companies such as, for example, a gas supply company for collecting various data on the gas hot water supply 1 and the gas cooking stove 3.

The central station apparatus 10 sends an instruction to the wireless base station 5 through the line 9 to collect various data on the gas hot water supply 1 or the gas cooking stove 3 (for example, data indicating an operation state of the gas hot water supply 1 or the gas cooking stove 3). The line 9 can be a wire telephone line, a wireless telephone line such as PHS, or a dedicated line for the system 1a.

The wireless base station 5 sends an instruction from the central station apparatus 10 using a wireless communication.

In response to a wireless signal from the wireless base station 5, the wireless terminal 2 obtains data on the gas hot water supply 1 (for example, data indicating the operation state of the gas hot water supply 1) and sends the obtained data to the wireless base station 5 through a wireless communication.

In response to a wireless signal from the wireless base station 5, the wireless terminal 4 obtains data on the gas cooking stove 3 (for example, data indicating the operation state of the gas cooking stove 3) and sends the obtained data to the wireless base station 5 through a wireless communication.

Upon receiving the wireless signal from the wireless terminal 2 or 4, the wireless base station 5 sends the wireless signal to the central station apparatus 10 through the line 9. The operation of the wireless base station 5 is controlled by the control section 6.

Thus, the central station apparatus 10 can collect data on the gas hot water supply 1 and the gas cooking stove 3 which are installed at a remote site.

In the wireless data collection system 1a, the communication protocol between the wireless base station 5 and each of the wireless terminals 2 and 4 is predetermined. When a malfunction of the control section 6 for controlling the operation of the wireless base station 5 prevents the wireless base station 5 from sending a wireless signal matching the communication protocol to the wireless terminal 2 or 4, the wireless communication between the wireless base station 5 and each of the wireless terminals 2 and 4 is made impossible.

In order to increase contents of the various data on the gas hot water supply 1 or the gas cooking stove 3 to be collected by the central station apparatus 10, the wireless base station 5 needs to send a wireless signal to the wireless terminal 2 or 4 indicating that the increased portion of the data is to be collected.

For example, it is assumed that the central station apparatus 10 usually collects data indicating the "combustion amount" of the gas hot water supply 1 and the gas cooking stove 3, but now data indicating the "combustion time period" also needs to be collected by the central station apparatus 10. In this case, the wireless base station 5 needs to send a wireless signal to the wireless terminals 2 and 4 to request the data on the "combustion amount and the combustion period". However, when the control section 6 for controlling the wireless base station 5 is structured to request only the data indicating "combustion amount", even when the central station apparatus 10 sends an instruction to the wireless base station 5 requesting data indicating the "combustion amount" and the "combustion period", the wireless base station 5 sends an instruction to the wireless terminals 2 and 4 requesting only the data indicating the "combustion amount".

Thus, when the control section 6 for controlling the wireless base station 5 malfunctions or a change in the specifications of the control section 6 is needed, the contents of the control section 6 are required to be changed. The contents of the control section 6 are changed by rewriting the control information of the control section 6 stored in the memory in the control section 6. The control information of the control section 6 is rewritten by the rewriting section 8 based on the change information obtained by the information obtaining section 7. The control information of the control section 6 includes, for example, a control program or a control parameter for controlling the operation of the control section 6.

When the control section 6 malfunctions, the control section 6 can be recovered by rewriting, for example, the control program based on the change information obtained by the information obtaining section 7.

When a specification of the control section 6 needs to be changed, the specification of the control section 6 can be changed by rewriting, for example, the control program and/or the control parameter based on the change information obtained by the information obtaining section 7.

The information obtaining section 7 and the rewriting section 8 may each be integrated with the control section 6. In this case, the contents of the information obtaining section 7 or the rewriting section 8 can be rewritten.

Example 2

Figure 2:
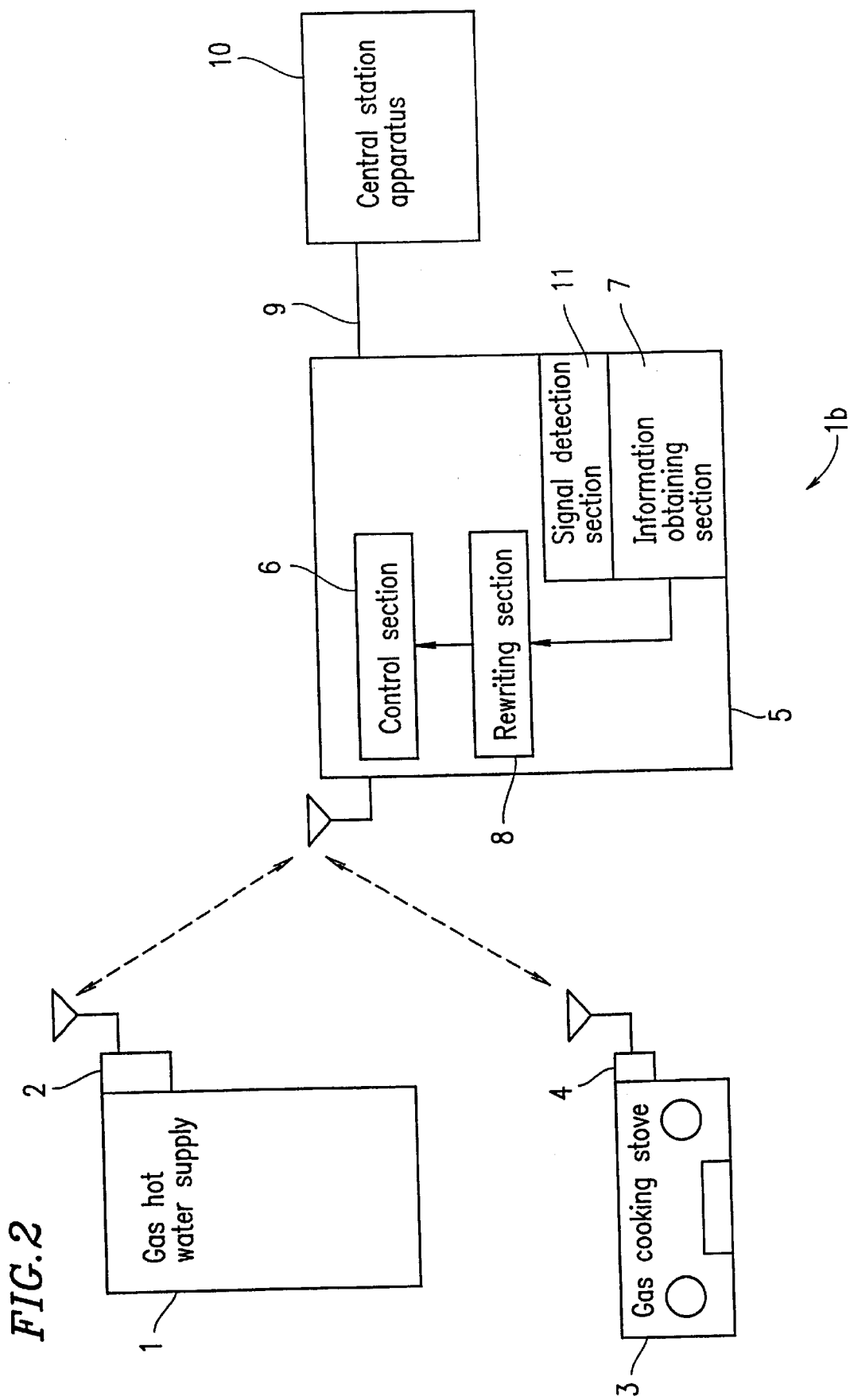
FIG. 2 is a block diagram showing a structure of a wireless data collection system $1b$ in a second example according to the present invention.

FIG. 2 shows a structure of a wireless data collection system 1b in a second example according to the present invention.

In FIG. 2, identical elements previously discussed with respect to FIG. 1 bear identical reference numerals and the descriptions thereof will be omitted.

As shown in FIG. 2, the wireless base station 5 includes a signal detection section 11 for detecting a signal indicating the timing at which the information obtaining section 7 is to start obtaining the change information, in addition to the elements shown in FIG. 1.

The central station apparatus 10 collects the data on the gas hot water supply 1 or the gas cooking stove 3 in the same manner to the manner described in the first example.

When the control section 6 for controlling the wireless base station 5 malfunctions or a change in the specifications of the control section 6 is needed, the contents of the control section 6 are required to be changed. The contents of the control section 6 are changed by rewriting the control information of the control section 6 stored in the memory in the control section 6. The control information of the control section 6 is rewritten by the rewriting section 8 based on the change information obtained by the information obtaining section 7. The timing at which the information obtaining section 7 is to start obtaining the change information is determined by the signal detected by the signal detection section 11.

When the signal detection section 11 detects a signal indicating the timing at which the information obtaining section 7 is to start obtaining the change information, the signal detection section 11 notifies the information obtaining section 7 that such a signal has been received. In response to the notification from the signal detection section 11, the information obtaining section 7 starts obtaining the change information from the outside the wireless base station 5.

The signal indicating the timing at which the information obtaining section 7 is to obtain the change information may be a signal having a prescribed voltage level, a signal including a rising edge or a signal including a falling edge.

The signal detection section 11 may be integrated with the information obtaining section 7. As in the first example, the information obtaining section 7 and the rewriting section 8 may each be integrated with the control section 6.

Example 3

Figure 3:
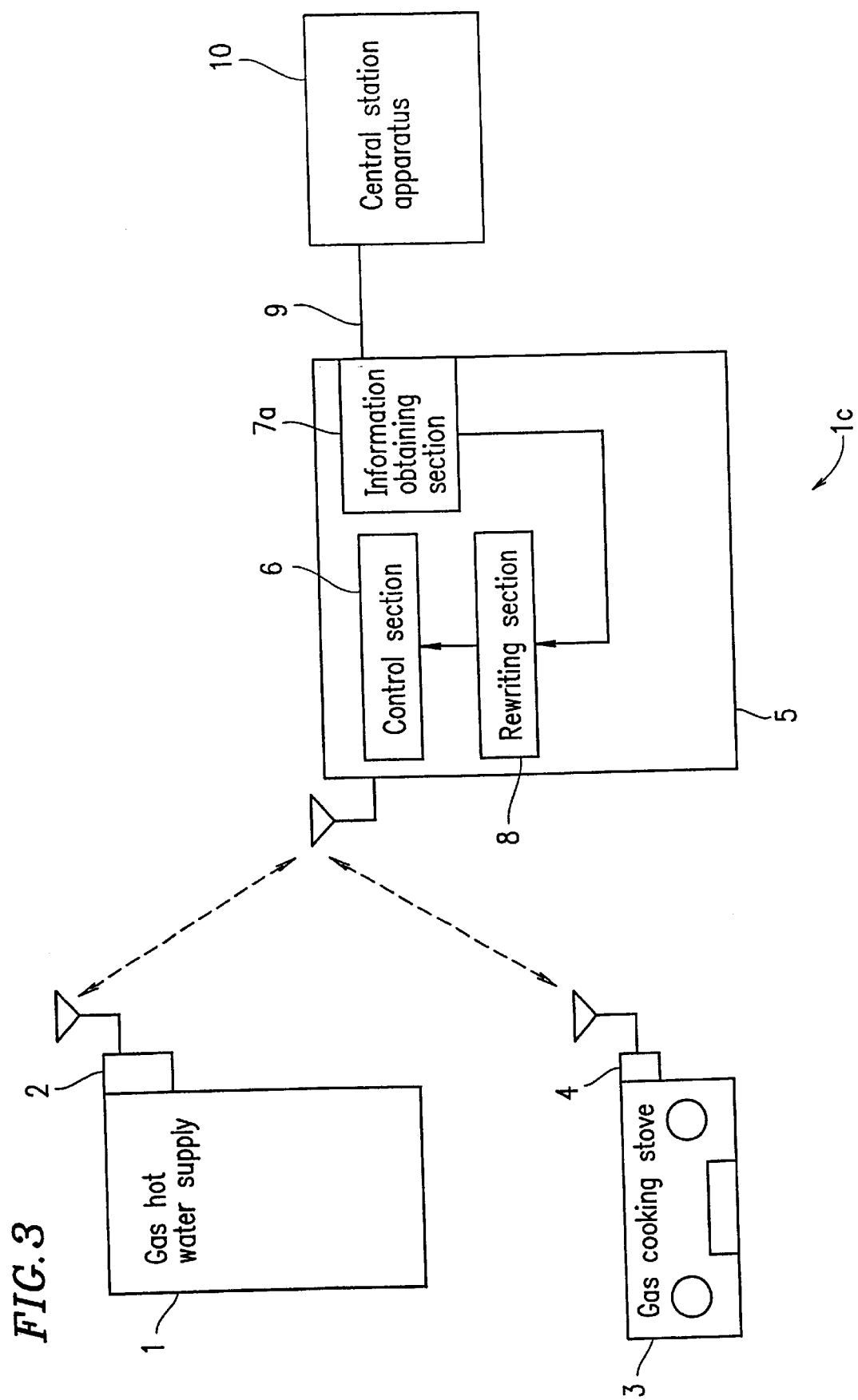
FIG. 3 is a block diagram showing a structure of a wireless data collection system $1a$ in a third example according to the present invention.

FIG. 3 shows a structure of a wireless data collection system 1a in a third example according to the present invention.

In FIG. 3, identical elements previously discussed with respect to FIG. 1 bear identical reference numerals and the descriptions thereof will be omitted.

As shown in FIG. 3, the wireless base station 5 includes an information obtaining section 7a for obtaining the change information from outside the wireless base station 5. The information obtaining section 7a is structured so as to be capable of obtaining the change information from the central station apparatus 10 through the line 9.

The central station apparatus 10 collects the data on the gas hot water supply 1 or the gas cooking stove 3 in the same manner to the manner described in the first example.

When the control section 6 for controlling the wireless base station 5 malfunctions or a change in the specifications of the control section 6 is needed, the contents of the control section 6 are required to be changed. The contents of the control section 6 are changed by rewriting the control information of the control section 6 stored in the memory in the control section 6. The control information of the control section 6 is rewritten by the rewriting section 8 based on the change information obtained by the information obtaining section 7a.

The information obtaining section 7a obtains and then analyses the information sent from the central station apparatus 10 through the line 9.

When the information sent from the central station apparatus 10 is an instruction to collect various data on the gas hot water supply 1 or the gas cooking stove 3, the information obtaining section 7a notifies the control section 6 of the contents of the instruction. In response to the notification from the information obtaining section 7a, the control section 6 sends an instruction to collect the data to the terminals 2 and 4.

When the information sent from the central station apparatus 10 is an instruction to change the contents of the control section 6, the information obtaining section 7a notifies the control section 6 of the contents of the instruction and sends the change information to the rewriting section 8. Then, the rewriting section 8 rewrites the control information of the control section 6 based on the change information.

As in the first example, the information obtaining section 7a and the rewriting section 8 may each be integrated with the control section 6.

Example 4

Figure 4:
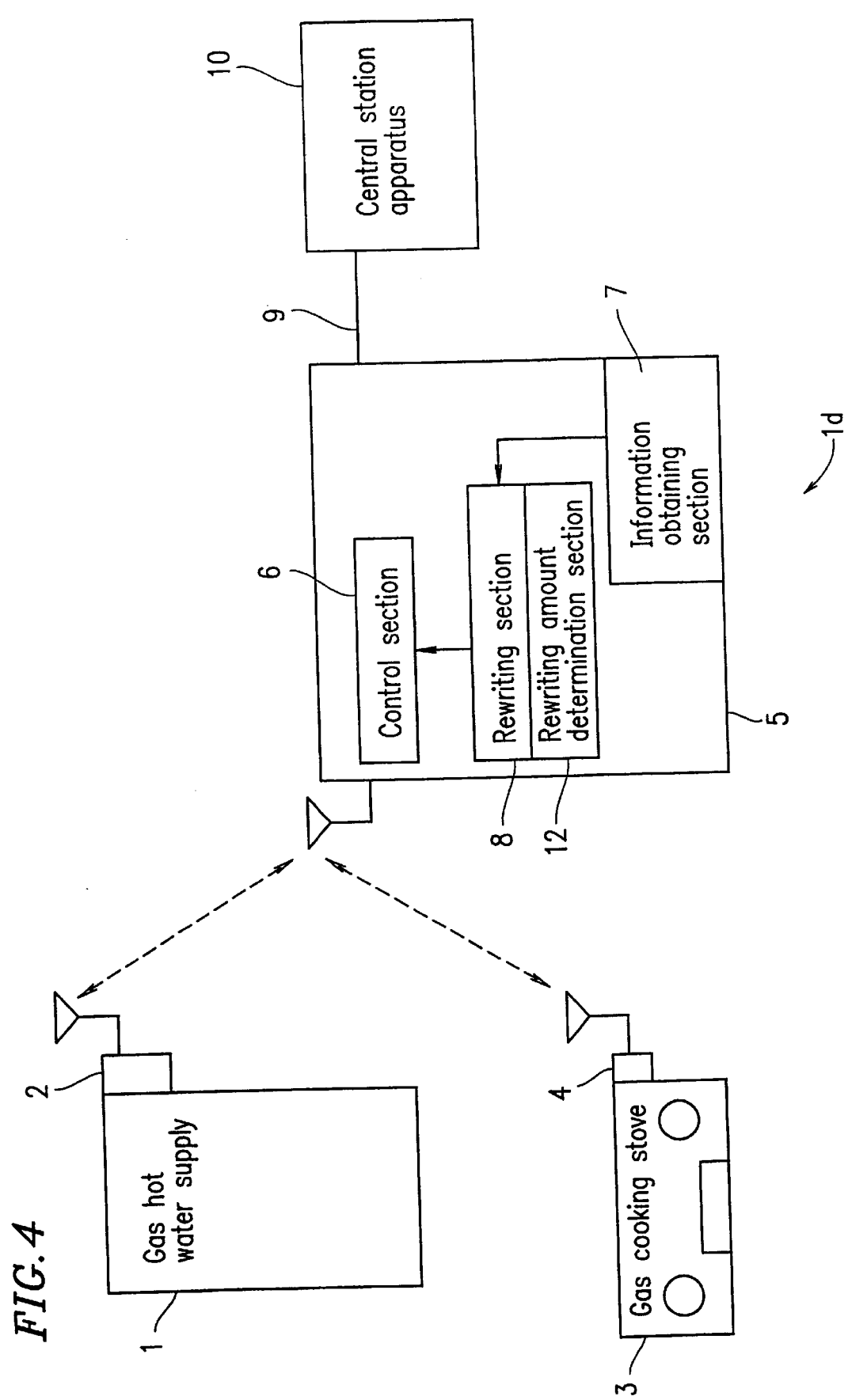
FIG. 4 is a block diagram showing a structure of a wireless data collection system $1d$ in a fourth example according to the present invention.

FIG. 4 shows a structure of a wireless data collection system 1d in a fourth example according to the present invention.

In FIG. 4, identical elements previously discussed with respect to FIG. 1 bear identical reference numerals and the descriptions thereof will be omitted.

As shown in FIG. 4, the wireless base station 5 includes a rewriting amount determination section 12 for determining whether the control information of the control section 6 is to be partially rewritten or entirely rewritten based on the change information obtained by the information obtaining section 7, in addition to the elements shown in FIG. 1.

The central station apparatus 10 collects the data on the gas hot water supply 1 or the gas cooking stove 3 in the same manner to the manner described in the first example.

When the control section 6 for controlling the wireless base station 5 malfunctions or a change in the specifications of the control section 6 is needed, the contents of the control section 6 are required to be changed. The contents of the control section 6 are changed by rewriting the control information of the control section 6 stored in the memory in the control section 6. The control information of the control section 6 is rewritten by the rewriting section 8 based on the change information obtained by the information obtaining section 7.

It is now assumed that a specification for communication is changed when the wireless communication between the wireless base station 5 and the wireless terminal 2 or 4 fails. For example, it is assumed that when a wireless signal sent from the wireless base station 5 cannot be normally received by the wireless terminal 2, the number of times that the wireless base station 5 resends the wireless signal to the wireless terminal 2 needs to be changed from "once" to "twice" in consideration of the deterioration in the radio wave environment. In this case, it is not necessary to change the format of the wireless signal, but changing only the number of times the wireless signal is to be resent from "once" to "twice" is sufficient. In the case where the control section 6 is structured to include a microcomputer, the change in the number of times the wireless signal is to be resent can be achieved by, for example, changing the parameter value of a counter including a RAM built in the microcomputer.

The change in the contents of the control section 6 in order to deal with the above-mentioned change in the specifications can only be a change in the parameter value, and it is not necessary to change the programming of the control section 6. In such a case, the rewriting amount determination section 12 determines that the control information of the control section 6 is to be partially changed (i.e., only the parameter value is changed), and then notifies the rewriting section 8 of the determination result. The rewriting section 8 rewrites the control information of the control section 6 based on the determination result obtained by the rewriting amount determination section 12.

The determination section 12 may be integrated with the rewriting section 8. As in the first example, the information obtaining section 7 and the rewriting section 8 may each be integrated with the control section 6.

Example 5

Figure 5:
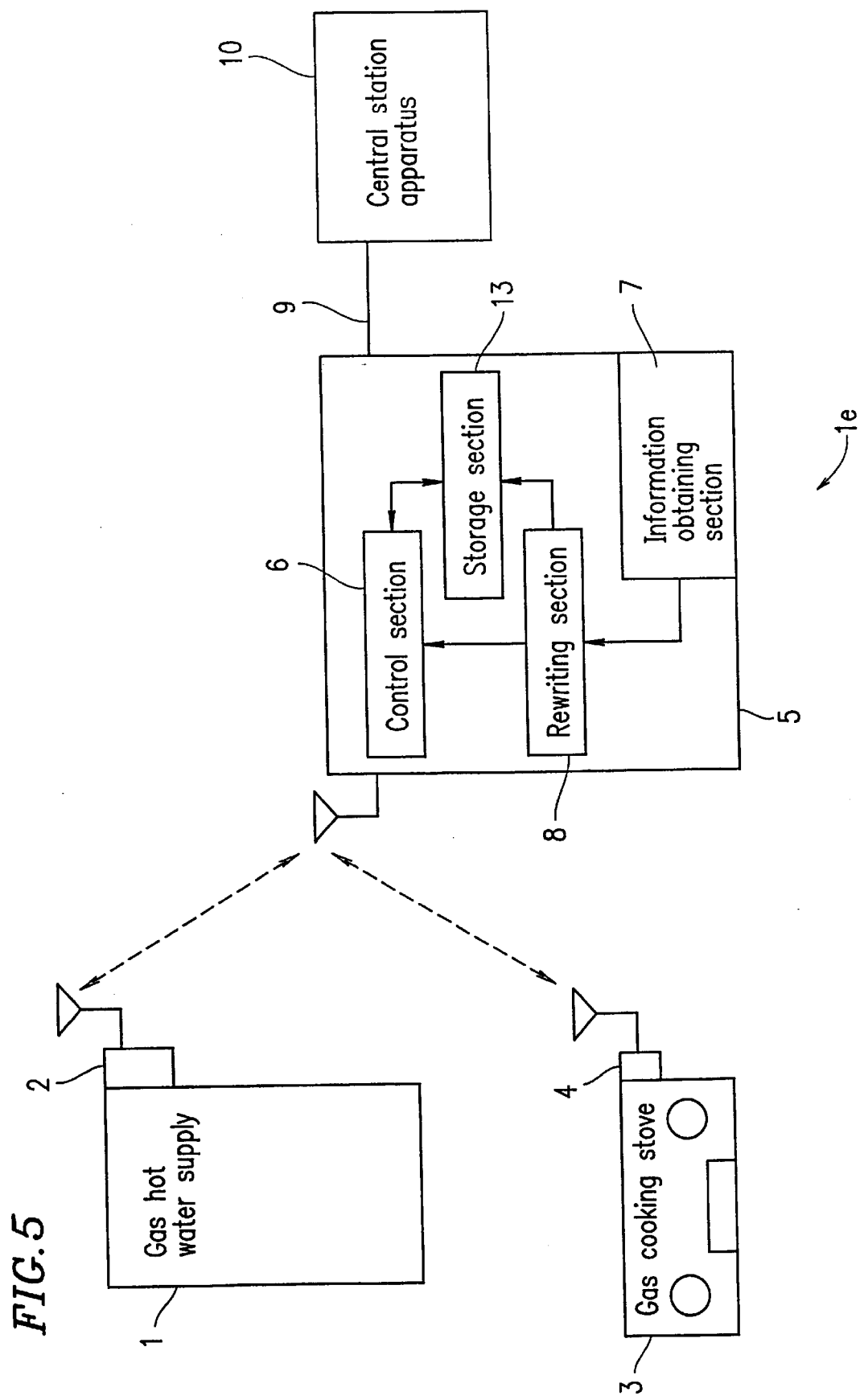
FIG. 5 is a block diagram showing a structure of a wireless data collection system $1e$ in a fifth example according to the present invention.

FIG. 5 shows a structure of a wireless data collection system 1e in a fifth example according to the present invention.

In FIG. 5, identical elements previously discussed with respect to FIG. 1 bear identical reference numerals and the descriptions thereof will be omitted.

As shown in FIG. 5, the wireless base station 5 includes a storage section 13 for temporarily storing the control information of the control section 6, in addition to the elements shown in FIG. 1.

The central station apparatus 10 collects the data on the gas hot water supply 1 or the gas cooking stove 3 in the same manner to the manner described in the first example.

When the control section 6 for controlling the wireless base station 5 malfunctions or a change in the specifications of the control section 6 is needed, the contents of the control section 6 are required to be changed. The contents of the control section 6 are changed by rewriting the control information of the control section 6 stored in the memory in the control section 6. The control information of the control section 6 is rewritten by the rewriting section 8 based on the change information obtained by the information obtaining section 7.

The storage section 13 temporarily stores the control information of the control section 6 before the rewriting section 8 rewrites the control information of the control section 6. This means that a backup copy of the control information of the control section 6 is stored in the storage section 13. When the rewriting section 8 fails in rewriting the control information of the control section 6, the control information of the control section 6 stored in the storage section 13 is transferred to the memory in the control section 6. As a result, the control section 6 operates in accordance with the control information of the control section 6 transferred from the storage section 13. Thus, the contents of the control section 6 can be recovered by storing backup copy of the control information of the control section 6.

Conceivable reasons of failure of the rewriting section 8 in rewriting the control information of the control section 6 are, for example, the change information disappearing in the middle of rewriting of the control information of the control section 6, and access to the control section 6 being made impossible in the middle of rewriting of the control information of the control section 6. By storing the backup copy of the control information of the control section 6, the contents of the control section 6 can be recovered even when the rewriting section 8 fails in rewriting the control information of the control section 6 for some reason. Thus, the operation of the wireless base station 5 can be maintained.

The storage section 13 may be integrated with the rewriting section 8. As in the first example, the information obtaining section 7 and the rewriting section 8 may each be integrated with the control section 6.

Example 6

Figure 6:
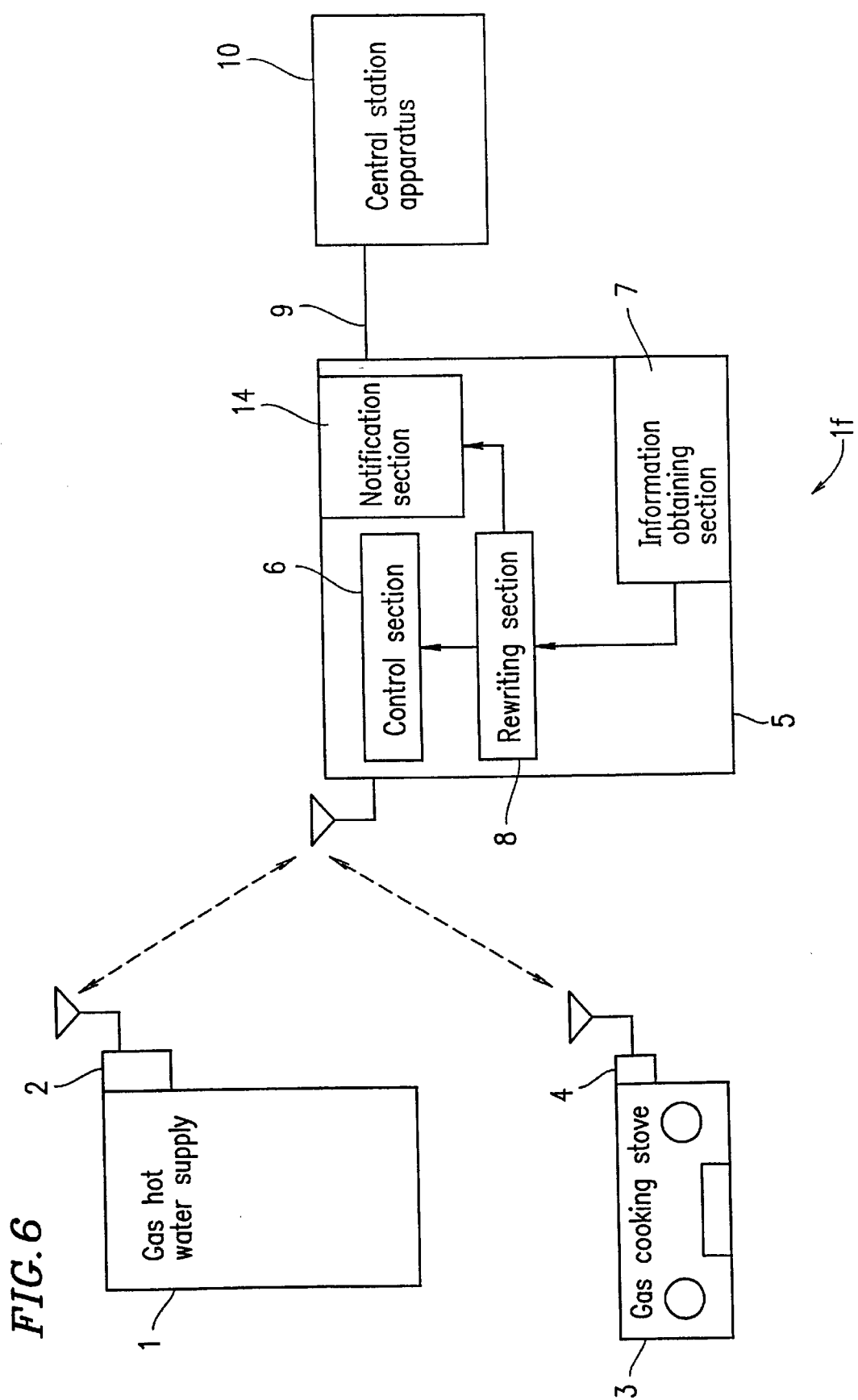
FIG. 6 is a block diagram showing a structure of a wireless data collection system $1f$ in a sixth example according to the present invention.

FIG. 6 shows a structure of a wireless data collection system 1f in a sixth example according to the present invention.

In FIG. 6, identical elements previously discussed with respect to FIG. 1 bear identical reference numerals and the descriptions thereof will be omitted.

As shown in FIG. 6, the wireless base station 5 includes a notification section 14 for notifying of a rewriting result of the control information of the control section 6 (i.e., whether the rewriting section 8 has succeeded or failed in rewriting the control information of the control section 6) to outside the wireless base station 5, in addition to the elements shown in FIG. 1.

The central station apparatus 10 collects the data on the gas hot water supply 1 or the gas cooking stove 3 in the same manner to the manner described in the first example.

When the control section 6 for controlling the wireless base station 5 malfunctions or a change in the specifications of the control section 6 is needed, the contents of the control section 6 are required to be changed. The contents of the control section 6 are changed by rewriting the control information of the control section 6 stored in the memory in the control section 6. The control information of the control section 6 is rewritten by the rewriting section 8 based on the change information obtained by the information obtaining section 7.

The rewriting section 8 sends a signal indicating the rewriting result of the control information of the control section 6 to the notification section 14. Conceivable reasons of failure of the rewriting section 8 in rewriting the control information of the control section 6 are, for example, as described in the fifth example.

The notification section 14 notifies of the rewriting result of the control information of the control section 6 to outside the wireless base station 5. However, the manner of notifying of the rewriting result of the control information of the control section 6 is not limited to any specific manner. The rewriting result may be notified of, for example, by an indicator such as an LED provided on the wireless base station 5 or through a communication to the central station apparatus 10 through the line 9.

The notification section 14 may be integrated with the rewriting section 8. As in the first example, the information obtaining section 7 and the rewriting section 8 may each be integrated with the control section 6.

Example 7

Figure 7:
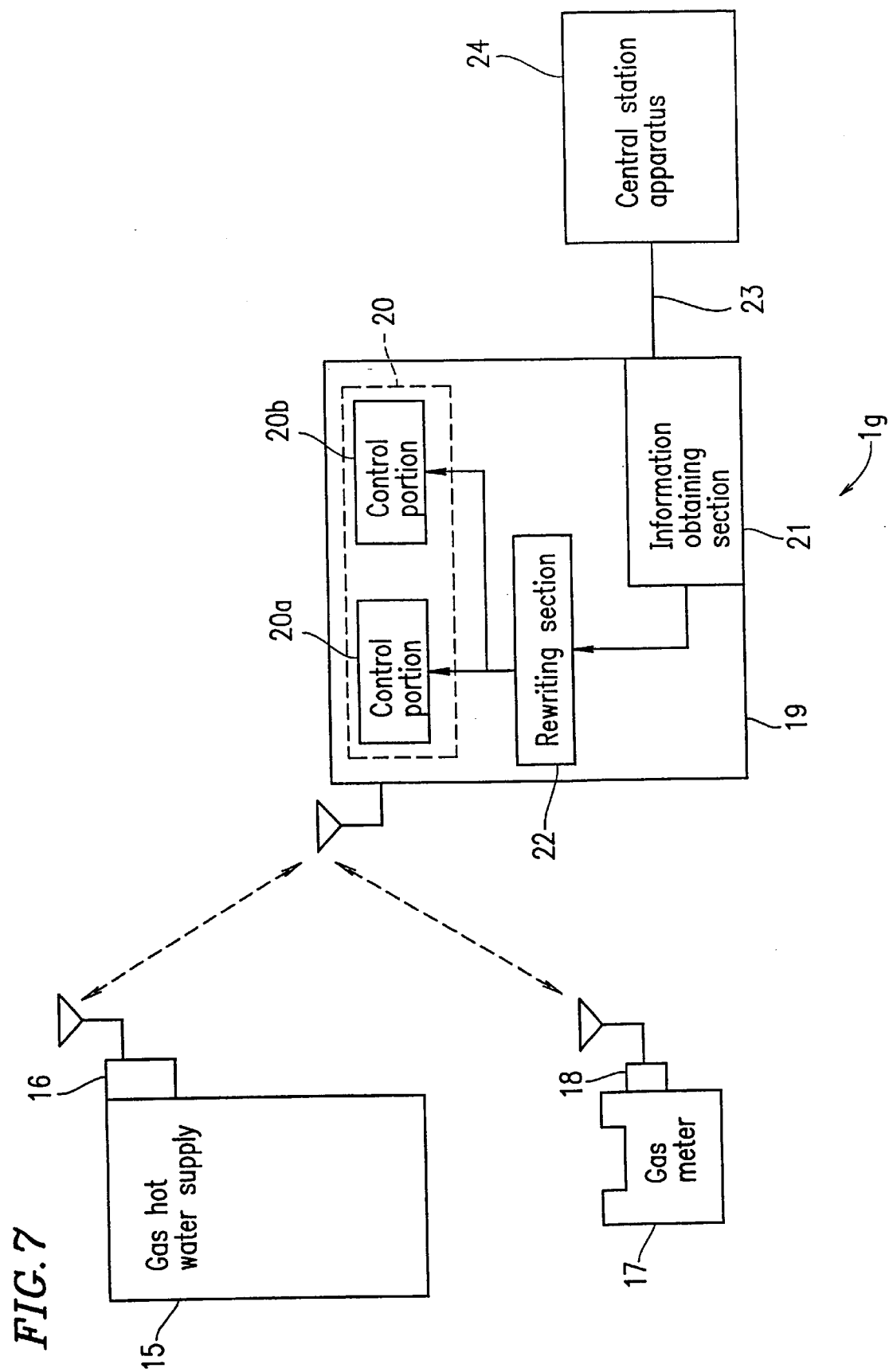
FIG. 7 is a block diagram showing a structure of a wireless data collection system $1g$ in a seventh example according to the present invention.

FIG. 7 shows a structure of a wireless data collection system 1g in a seventh example according to the present invention.

The wireless data collection system 1g includes a wireless terminal 16 provided for a gas hot water supply 15, a wireless terminal 18 provided for a gas meter 17, a wireless base station 19 for communicating with the wireless terminals 16 and 18 through a wireless communication to collect data on the gas hot water supply 15 and the gas meter 17, and a central station apparatus 24 for communicating with the wireless base station 19 through a line 23 such as, for example, a telephone line.

The gas hot water supply 15 is installed, for example, outside a house. The wireless terminal 16 may be attached to or built in the gas hot water supply 15.

The gas meter 17 is installed, for example, outside the house. The wireless terminal 18 may be attached to or built in the gas meter 17.

The wireless base station 19 includes a control section 20 for controlling an operation of the wireless base station 19. The control section 20 includes a control portion 20a and a control portion 20b which can be selectively operated.

The wireless base station 19 includes an information obtaining section 21 for obtaining change information for changing the operation of the control section 20 from outside the wireless base station 19, and a rewriting section 22 for rewriting at least one of information defining an operation of the control portion 20a and information defining an operation of the control portion 20b based on the change information obtained by the information obtaining section 21 and for determining which one of the control portion 20a or 20b is to be operated.

In the following description, the "information defining the operation of the control portion 20*a*" will be referred to as the "control information of the control portion 20*a*" and the "information defining the operation of the control portion 20*b*" will be referred to as the "control information of the control portion 20*b*".

The control portion 20*a* operates in accordance with the control information of the control portion 20*a*. Therefore, the operation of the control portion 20*a* can be changed by rewriting the control information of the control portion 20*a*. The control information of the control portion 20*a* is stored in, for example, a rewritable memory (not shown) in the control portion 20*a*.

The control portion 20*b* operates in accordance with the control information of the control portion 20*b*. Therefore, the operation of the control portion 20*b* can be changed by rewriting the control information of the control portion 20*b*. The control information of the control portion 20*b* is stored in, for example, a rewritable memory (not shown) in the control portion 20*b*.

The information obtaining section 21 may be attached to or built in the wireless base station 19.

The central station apparatus 24 is managed by, for example, companies such as, for example, a gas supply company for collecting various data on the gas hot water supply 15 and the gas meter 17.

The central station apparatus 24 sends an instruction to the wireless base station 19 through the line 23 to collect various data on the gas hot water supply 15 or the gas meter 17 (for example, data indicating an operation state of the gas hot water supply 15, data indicating a value of the gas meter 17, or security data on the gas meter 17). The line 23 can be a wire telephone line, a wireless telephone line such as PHS, PDC, PDCP or the like, or a dedicated line for the system 1*g*.

The wireless base station 19 sends an instruction from the central station apparatus 24 using a wireless communication.

In response to a wireless signal from the wireless base station 19, the wireless terminal 16 obtains data on the gas hot water supply 15 (for example, data indicating the operation state of the gas hot water supply 15) and sends the obtained data to the wireless base station 19 through a wireless communication.

In response to a wireless signal from the wireless base station 19, the wireless terminal 18 obtains data on the gas meter 17 (for example, data indicating the operation state of the gas meter 17) and sends the obtained data to the wireless base station 19 through a wireless communication.

Upon receiving the wireless signal from the wireless terminal 16 or 18, the wireless base station 19 sends the wireless signal to the central station apparatus 24 through the line 23. The operation of the wireless base station 19 is controlled by the control portion 20*a* or 20*b*.

Thus, the central station apparatus 24 can collect data on the gas hot water supply 15 and the gas meter 17 which are installed at a remote site.

In the wireless data collection system 1*g*, the communication protocol between the wireless base station 19 and each of the wireless terminals 16 and 18 is predetermined. When a software malfunction of the control section 20 for controlling the operation of the wireless base station 19 prevents the wireless base station 19 from sending a wireless signal matching the communication protocol to the wireless terminal 16 or 18, the wireless communication between the wireless base station 19 and each of the wireless terminals 16 and 18 is made impossible.

In order to increase contents of the various data on the gas hot water supply 15 or the gas meter 17 to be collected by the central station apparatus 24, the wireless base station 19 needs to send a wireless signal to the wireless terminal 16 or 18 indicating that the increased portion of the data is to be collected.

For example, it is assumed that the central station apparatus 24 usually collects data indicating the "combustion amount" of the gas hot water supply 15 and the gas meter 17, but now data indicating the "combustion time period" also needs to be collected by the central station apparatus 24. In this case, the wireless base station 19 needs to send a wireless signal to the wireless terminals 16 and 18 to request the data on the "combustion amount" and the "combustion period". However, when the control section 20 for controlling the wireless base station 19 is structured to request only the data indicating "combustion amount", even when the central station apparatus 24 sends an instruction to the wireless base station 19 requesting data indicating the "combustion amount" and the "combustion period", the wireless base station 19 sends an instruction to the wireless terminals 16 and 18 requesting only the data indicating the "combustion amount".

Thus, when a software malfunction of the control section 20 for controlling the wireless base station 19 occurs or a change in the specifications of the control section 20 is needed, the contents of the control section 20 are required to be changed. The contents of the control section 20 are changed by rewriting the control information of the control portion 20*a* stored in the memory in the control portion 20*a* or by rewriting the control information of the control portion 20*b* stored in the memory in the control portion 20*b*.

The control information of the control portion 20*a* is rewritten by the rewriting section 22 based on the change information obtained by the information obtaining section 21. The control information of the control portion 20*a* includes, for example, a control program or a control parameter for controlling the operation of the control portion 20*a*.

The control information of the control portion 20*b* is rewritten by the rewriting section 22 based on the change information obtained by the information obtaining section 21. The control information of the control portion 20*b* includes, for example, a control program or a control parameter for controlling the operation of the control portion 20*b*.

When a software malfunction of the control section 20 occurs, the control section 20 can be recovered by rewriting, for example, the control program based on the change information obtained by the information obtaining section 21.

When a specification of the control section 20 needs to be changed, the specification of the control section 20 can be changed by rewriting, for example, the control program and/or the control parameter based on the change information obtained by the information obtaining section 21.

The wireless base station 19 can obtain the change information from the central station apparatus 24 through the line 23. In the case where the data amount of the change information is excessively large, the change information is preferably divided into a plurality of portions and these portions are sequentially sent to the wireless base station 19 from the central station apparatus 24.

The information obtaining section 21 sequentially receives the portions of the change information sent from the central station apparatus 24 and sequentially transfers the received portions to the rewriting section 22.

The rewriting section 22 rewrites the control information of the control portion 20*b* based on the portions of the change information transferred from the information obtaining section 21 while the wireless base station 19 operates in accordance with the control portion 20b. Then, the rewriting section 22 switches the wireless base station 19, which is currently controlled by the control portion 20a, to be controlled by the control portion 20b at prescribed timing (for example, in response to a reset operation). As a result, the wireless base station 19 starts operating in accordance with the control portion 20b.

Even when an error occurs in the change information while the change information is being sent from the central station apparatus 24 to the wireless base station 19 or the transmission of the change information is interrupted, the wireless base station 19 is not made inoperable. The reason for this is that the wireless base station 19 operates in accordance with the control portion 20a until the rewriting of the control information of the control portion 20b based on the change information is completed.

The information obtaining section 21 and the rewriting section 22 may each be integrated with the control portion 20a and 20b. The functions of the information obtaining section 21, the rewriting section 22, and the control portions 20a and 20b can be realized by, for example, a microcomputer. In this case, the contents of the information obtaining section 21 or the rewriting section 22 can be rewritten.

As described above, the wireless data collection system 1g allows the control information of the control portion 20a or the control information of the control portion 20b to be rewritten by the rewriting section 22. Thus, a malfunction of the control section 20 or a need to change the specifications of the control section 20 can be dealt with without replacing the wireless base station 19. The contents of the control information of the control section 20 can be returned to the previous contents.

Thus, the wireless data collection system 1g can collect various data on a housing apparatus without causing any inconvenience even when a malfunction of the apparatus occurs or a change in specifications of the apparatus is needed.

Example 8

Figure 8:
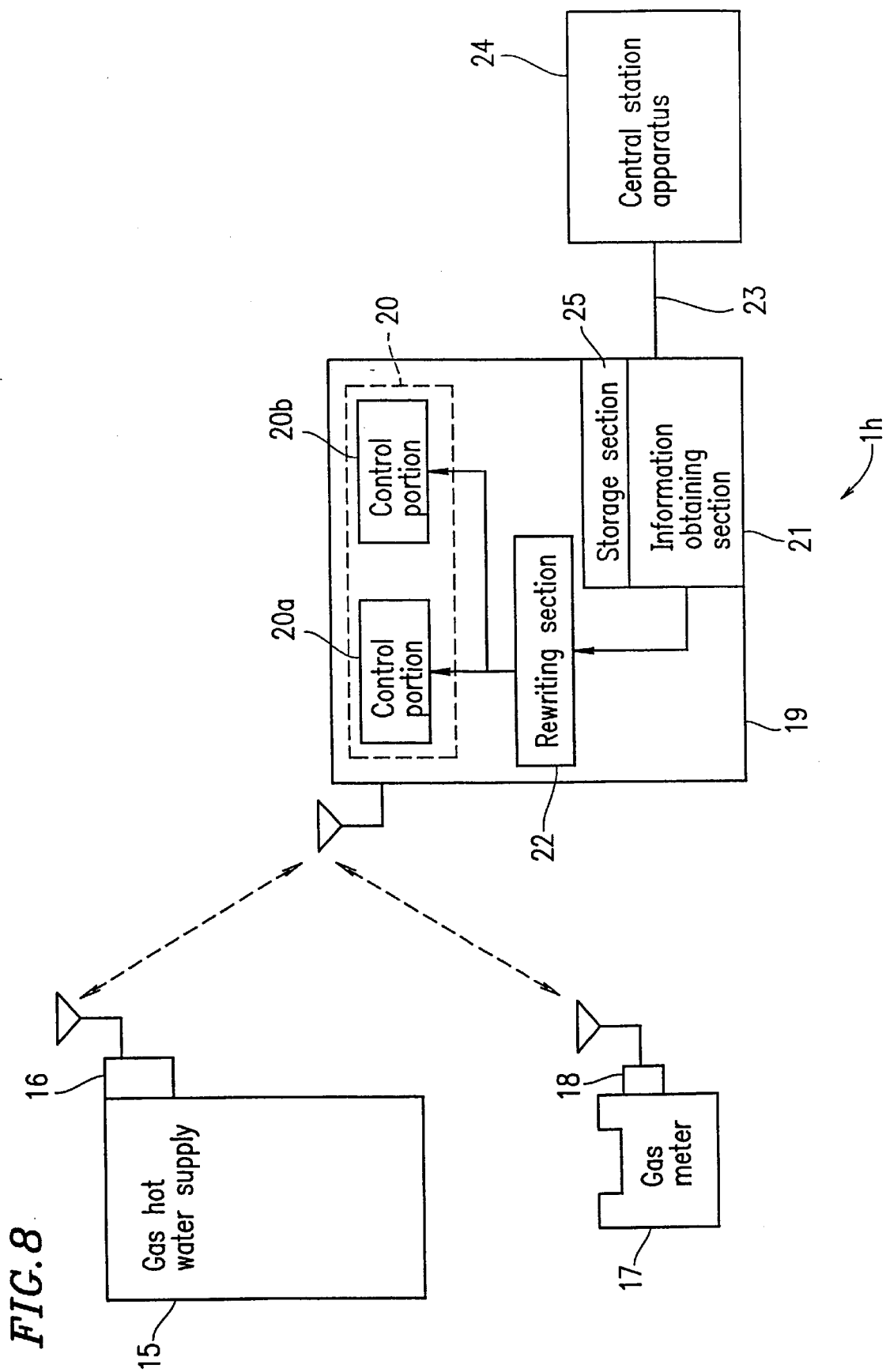
FIG. 8 is a block diagram showing a structure of a wireless data collection system $1h$ in an eighth example according to the present invention.

FIG. 8 shows a structure of a wireless data collection system 1h in an eighth example according to the present invention.

In FIG. 8, identical elements previously discussed with respect to FIG. 7 bear identical reference numerals and the descriptions thereof will be omitted.

As shown in FIG. 8, the wireless base station 19 includes a storage section 25 for temporarily storing the change information obtained by the information obtaining section 21, in addition to the elements shown in FIG. 7.

The central station apparatus 24 collects the data on the gas hot water supply 15 or the gas meter 17 in the same manner to the manner described in the seventh example.

The wireless base station 19 can obtain the change information from the central station apparatus 24 through the line 23. In the case where the data amount of the change information is excessively large, the change information is preferably divided into a plurality of portions and these portions are sequentially sent to the wireless base station 19 from the central station apparatus 24.

The information obtaining section 21 sequentially receives the portions of the change information sent from the central station apparatus 24 and stores the portions of the change information in the storage section 25. After all the portions of the change information are stored in the storage section 25, it is determined whether an error has occurred in the change information using an error correction code or the like. When no error has occurred in the change information (i.e., when the transmission of the change information from the central station apparatus 24 to the wireless base station 19 has been completed normally), the change information stored in the storage section 25 is transferred to the rewriting section 22. The rewriting section 22 rewrites the control information of the control portion 20a or the control information of the control portion 20b based on the change information.

Thus, the rewriting section 22 is not used for rewriting until the transmission of the change information from the central station apparatus 24 to the wireless base station 19 is completed normally. Accordingly, the rewriting section 22 can perform processing other than rewriting (for example, processing other than in a writing mode) until the transmission of the change information from the central station apparatus 24 to the wireless base station 19 is completed normally.

In the case where the line 23 is a wire line or a wireless line such as PHS, PDC, PDCP or the like, it takes the information obtaining section 21 about 3 or 4 minutes to completely receive the change information from starting the receipt of the change information. Even in such a case, the rewriting section 22 is not influenced by the communication rate of the line 23.

The storage section 25 may be integrated with the information obtaining section 21. The functions of the storage section 25 and the information obtaining section 21 can be realized by, for example, a microcomputer. As in the seventh example, the information obtaining section 21 and the rewriting section 22 may each be integrated with the control portions 20a and 20b.

As described above, the wireless data collection system 1h allows the rewriting section 22 to rewrite the control information of the control section 20 based on the change information for changing the operation of the control section 20 only when the change information is confirmed to have been received by the information obtaining section 21 with no error. Thus, even when the line 23 is disconnected in the middle of rewriting of the control information of the control section 20, the wireless base station 19 can be prevented from being made inoperable.

Thus, the wireless data collection system 1h can collect various data on a housing apparatus at a relatively high reliability.

Example 9

Figure 9:
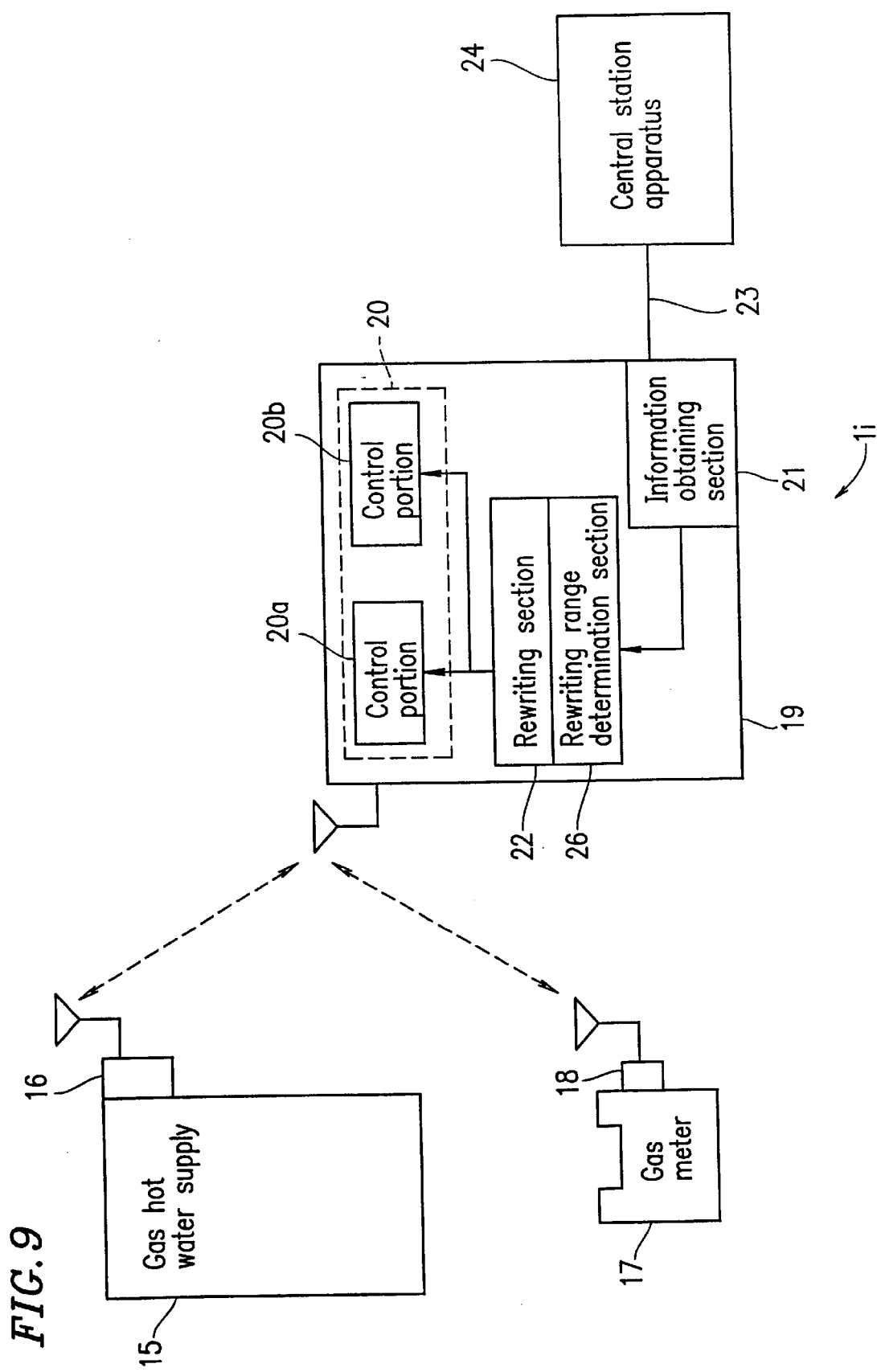
FIG. 9 is a block diagram showing a structure of a wireless data collection system $1i$ in a ninth example according to the present invention.

FIG. 9 shows a structure of a wireless data collection system 1i in a ninth example according to the present invention.

In FIG. 9, identical elements previously discussed with respect to FIG. 7 bear identical reference numerals and the descriptions thereof will be omitted.

As shown in FIG. 9, the wireless base station 19 includes a rewriting range determination section 26 for determining whether only the control information of the control portion 20a is to be rewritten, only the control information of the control portion 20b is to be rewritten, or both of the control information of the control portion 20a and the control information of the control portion 20b are to be rewritten based on the change information obtained by the information obtaining section 21, in addition to the elements shown in FIG. 7.

The central station apparatus 24 collects the data on the gas hot water supply 15 or the gas meter 17 in the same manner to the manner described in the seventh example.

When a software malfunction of the control section 20 for controlling the wireless base station 19 occurs or a change in the specifications of the control section 20 is needed, the contents of the control section 20 are required to be changed. The contents of the control section 20 are changed by rewriting the control information of the control portion 20a stored in the memory in the control portion 20a or by rewriting the control information of the control portion 20b stored in the memory in the control portion 20b. Whether only the control information of the control portion 20a is to be rewritten, only the control information of the control portion 20b is to be rewritten, or both of the control information of the control portion 20a and the control information of the control portion 20b are to be rewritten is determined by the rewriting range determination section 26.

The rewriting range determination section 26 notifies the control portions 20a and 20b of a determination result thereof and outputs the change information to the rewriting section 22. The rewriting section 22 rewrites at least one of the control informaton of the control portion 20a and the control information of the control portion 20b based on the change information.

The rewriting range determination section 26 may be integrated with the rewriting section 22. The functions of the rewriting range determination section 26 and the rewriting section 22 can be realized by, for example, a microcomputer. As in the seventh example, the information obtaining section 21 and the rewriting section 22 may each be integrated with the control portions 20a and 20b.

As described above, the wireless data collection system 1i provides selection on whether only the control information of the control portion 20a is to be rewritten, only the control information of the control portion 20b is to be rewritten, or both the control information of the control portion 20a and the control information of the control portion 20b are to be rewritten, based on the change information obtained by the information obtaining section 21. By selecting the rewriting range of the control information in this manner, the number of rewriting of the control information performed by the rewriting section 22 can be reduced.

Example 10

Figure 10:
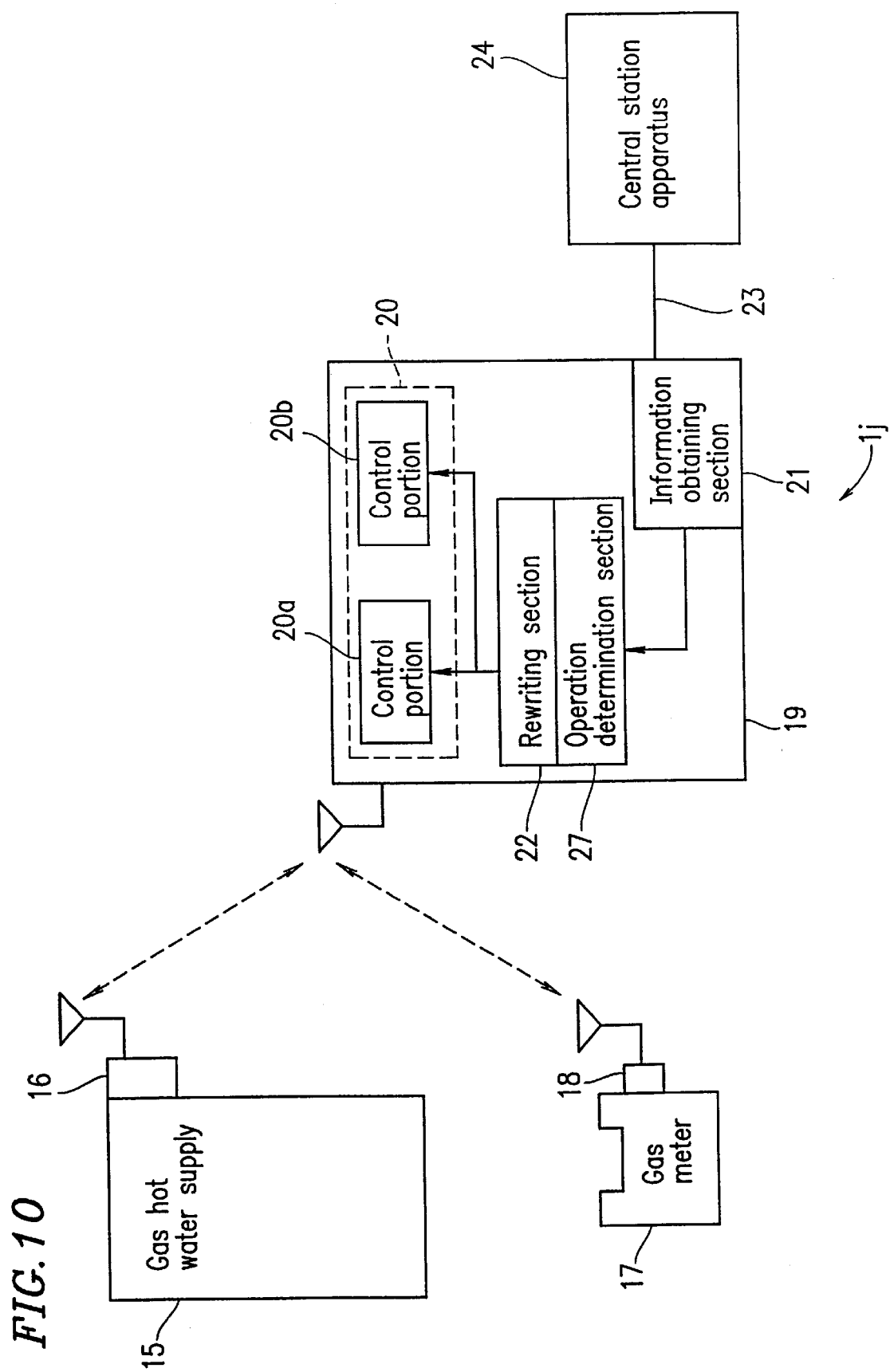
FIG. 10 is a block diagram showing a structure of a wireless data collection system $1j$ in a tenth example according to the present invention.

FIG. 10 shows a structure of a wireless data collection system 1j in a tenth example according to the present invention.

In FIG. 10, identical elements previously discussed with respect to FIG. 7 bear identical reference numerals and the descriptions thereof will be omitted.

As shown in FIG. 10, the wireless base station 19 includes an operation determination section 27 for determining whether the wireless base station 19 is to operate in accordance with the control portion 20a or the control portion 20b based on the change information obtained by the information obtaining section 21, in addition to the elements shown in FIG. 7.

The central station apparatus 24 collects the data on the gas hot water supply 15 or the gas meter 17 in the same manner to the manner described in the seventh example.

When a software malfunction of the control section 20 for controlling the wireless base station 19 occurs or a change in the specifications of the control section 20 is needed, the contents of the control section 20 are required to be changed. The contents of the control section 20 are changed by rewriting the control information of the control portion 20a stored in the memory in the control portion 20a or by rewriting the control information of the control portion 20b stored in the memory in the control portion 20b.

It is now assumed that the wireless base station 19 operates in accordance with the control portion 20a. In this case, the rewriting section 22 rewrites the control information of the control portion 20b, not the control portion 20a in operation, based on the change information obtained by the information obtaining section 21. After the rewriting of the control information of the control portion 20b is completed, the rewriting section 22 switches the wireless base station 19, which is currently controlled by the control portion 20a, to be controlled by the control portion 20b at prescribed timing (for example, in response to a reset operation). As a result, the wireless base station 19 starts operating in accordance with the control portion 20b.

It is now assumed that a specification for communication is changed when the wireless communication between the wireless base station 19 and the wireless terminal 16 or 18 fails. For example, it is assumed that when a wireless signal sent from the wireless base station 19 cannot be normally received by the wireless terminal 16, the number of times that the wireless base station 19 resends the wireless signal to the wireless terminal 16 needs to be changed from "once" to "twice" in consideration of the deterioration in the radio wave environment. In this case, the rewriting section 22 rewrites the control information of the control portion 20b so that the number of times that the wireless base station 19 resends the wireless signal is "twice", without rewriting the control information of the control portion 20a currently in operation (the number of times that the wireless base station 19 resends the wireless signal is "once"). After the rewriting of the control information of the control portion 20b is completed, the rewriting section 22 switches the wireless base station 19, which is currently controlled by the control portion 20a, to be controlled by the control portion 20b. As a result, the wireless base station 19 starts operating in accordance with the control portion 20b.

It is assumed that after the wireless base station 19 operates in accordance with the control portion 20b for a certain period of time (for example, several weeks), the number of times the wireless base station 19 resends the wireless signal needs to be returned from "twice" to "once". In this case, the rewriting section 22 switches the wireless base station 19, which is currently controlled by the control portion 20b, to be controlled by the control portion 20a, without rewriting the control information of the control portion 20a (the number of times that the wireless base station 19 resends the wireless signal is "once") or 20b (the number of times that the wireless base station 19 resends the wireless signal is "twice"). As a result, the wireless base station 19 again operates in accordance with the control portion 20a. Since it is not necessary to rewrite the control information of the control portion 20a or 20b, the change information can only include "information designating the control portion".

The operation determination section 27 determines whether the wireless base station 19 is to operate in accordance with the control portion 20a or 20b based on the change information including the "information designating the control portion". The wireless base station 19 operates in accordance with whichever control portion 20a or 20b determined by the operation determination section 27.

The operation determination section 27 may be integrated with the rewriting section 22. The functions of the operation determination section 27 and the rewriting section 22 can be realized by, for example, a microcomputer. As in the seventh example, the information obtaining section 21 and the rewriting section 22 may each be integrated with the control portions 20a and 20b.

As described above, the wireless data collection system 1j provides selection on whether the wireless base station 19 is to operate in accordance with the control portion 20a or 20b based on the change information obtained by the information obtaining section 21. Thus, the operation of the control section 20 can be returned to the operation before the change, without rewriting the control information of the control portion 20a or 20b.

Thus, the wireless data collection system 1 can collect various data on a housing apparatus at a relatively high reliability.

Example 11

Figure 11:
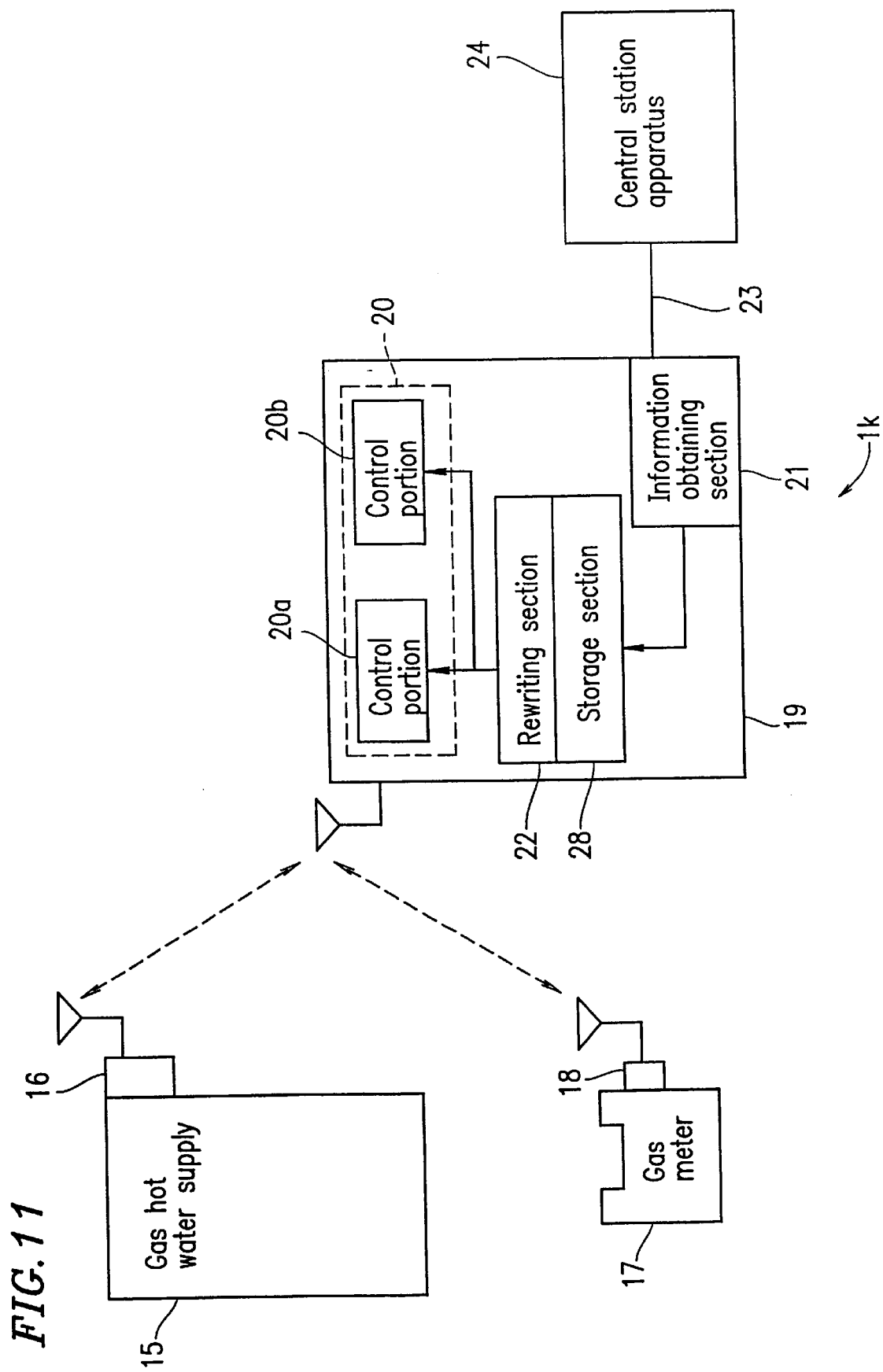
FIG. 11 is a block diagram showing a structure of a wireless data collection system $1k$ in an eleventh example according to the present invention.

FIG. 11 shows a structure of a wireless data collection system 1k in an eleventh example according to the present invention.

In FIG. 11, identical elements previously discussed with respect to FIG. 7 bear identical reference numerals and the descriptions thereof will be omitted.

As shown in FIG. 11, the wireless base station 19 includes a storage section 28 for storing information indicating which of the control portion 20a or 20b is currently in operation, in addition to the elements shown in FIG. 7.

The central station apparatus 24 collects the data on the gas hot water supply 15 or the gas meter 17 in the same manner to the manner described in the seventh example.

When a software-malfunction of the control section 20 for controlling the wireless base station 19 occurs or a change in the specifications of the control section 20 is needed, the contents of the control section 20 are required to be changed. The contents of the control section 20 are changed by rewriting the control information of the control portion 20a stored in the memory in the control portion 20a or by rewriting the control information of the control portion 20b stored in the memory in the control portion 20b.

It is now assumed that the wireless base station 19 operates in accordance with the control portion 20a. In this case, information indicating that the control portion 20a is currently in operation is stored in the storage section 28. The rewriting section 22 refers to the information stored in the storage section 28 to learn that the control portion 20a is currently in operation. Then, the rewriting section 22 rewrites the control information of the control portion 20b, not the control portion 20a in operation, based on the change information obtained by the information obtaining section 21. After the rewriting of the control information of the control portion 20b is completed, the rewriting section 22 switches the wireless base station 19, which is currently controlled by the control portion 20a, to be controlled by the control portion 20b at prescribed timing (for example, in response to a reset operation). The rewriting section 22 stores the information indicating that the control portion 20b is currently operation in the storage section 28. As a result, the wireless base station 19 starts operating in accordance with the control portion 20b.

By storing the information indicating which of the control portion 20a or 20b is currently in operation in this manner, an inquiry from the central station apparatus 24 on whether the control portion 20a or 20b is currently in operation can be readily responded to.

For example, the central station apparatus 24 sends a request signal to the wireless base station 19 requesting information on whether the control portion 20a or 20b is currently in operation. In response to the request signal from the central station apparatus 24, the information obtaining section 21 reads the information stored in the storage section 28 (the information indicating which of the control portion 20a or 20b is currently in operation) and sends the information to the central station apparatus 24. Thus, the central station apparatus 24 can learn which control portion is currently in operation. Then, for example, the central station apparatus 24 can send a request signal to the wireless base station 19 to request rewriting of the control information of the control portion not in operation.

Since the control section 20 is structured to include the control portions 20a and 20b, the operation of the control section 20 can be returned to the previous operation before the change, without any interruption or replacement of the wireless base station 19. Thus, the reliability of the wireless base station 19 can be guaranteed.

The storage section 28 may be integrated with the rewriting section 22. The functions of the storage section 28 and the rewriting section 22 can be realized by, for example, a microcomputer. As in the seventh example, the information obtaining section 21 and the rewriting section 22 may each be integrated with the control portions 20a and 20b.

As described above, the wireless data collection system 1k allows the information which indicates the control portion currently in operation to be stored in the storage section 28. Thus, the control information of the control portion currently in operation is prevented from being inadvertently rewritten to eliminate the backup copy of the previous control information of the same control portion.

Thus, the wireless data collection system 1k can collect various data on a housing apparatus at a relatively high reliability.

Example 12

Figure 12:
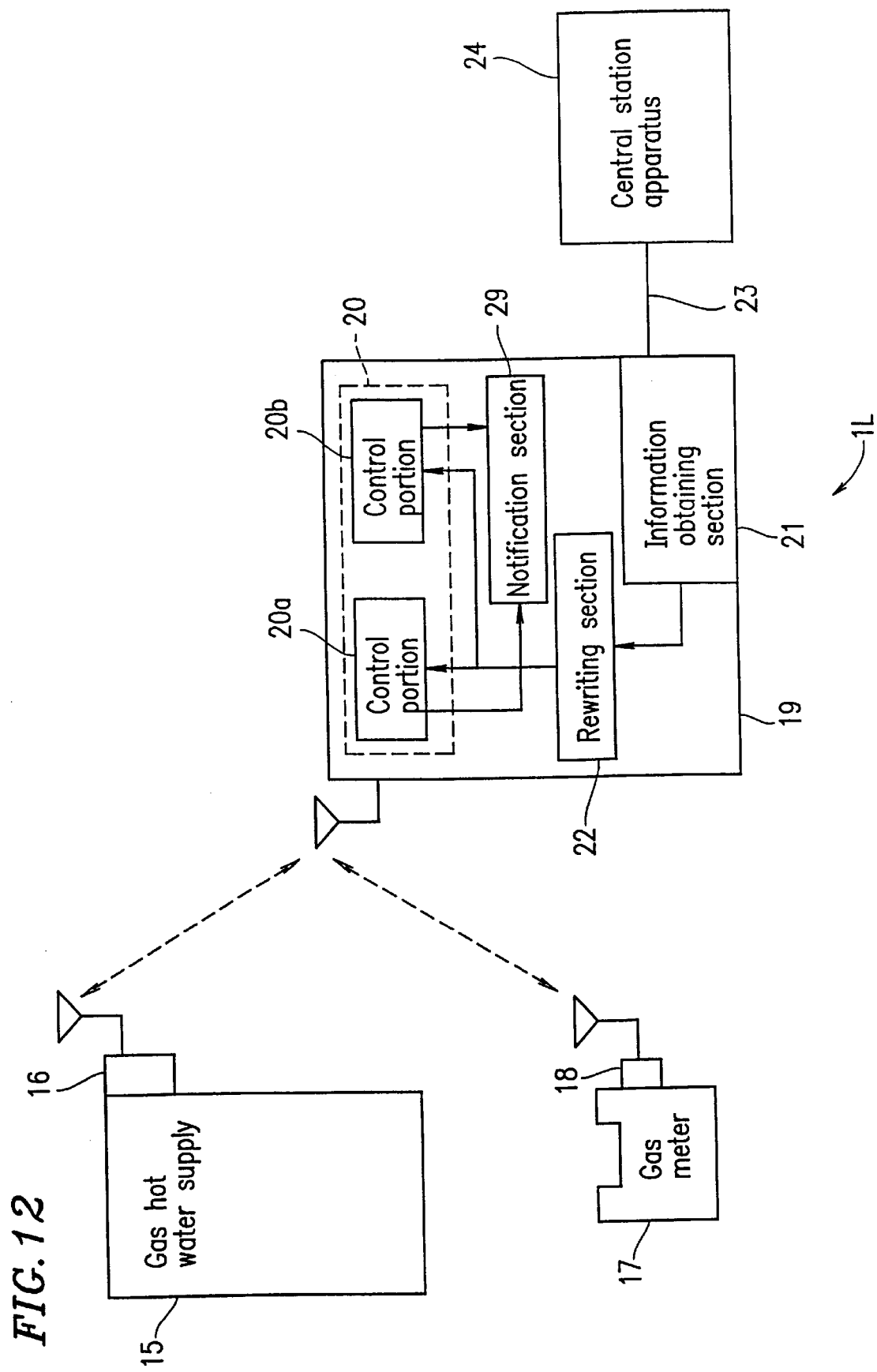
FIG. 12 is a block diagram showing a structure of a wireless data collection system 1L in a twelfth example according to the present invention.

FIG. 12 shows a structure of a wireless data collection system 1L in a twelfth example according to the present invention.

In FIG. 12, identical elements previously discussed with respect to FIG. 7 bear identical reference numerals and the descriptions thereof will be omitted.

As shown in FIG. 12, the wireless base station 19 includes a notification section 29 for notifying of a rewriting result of the control information of the control portion 20a and a rewriting result of the control information of the control portion 20b to outside the wireless base station 19, in addition to the elements shown in FIG. 7.

The central station apparatus 24 collects the data on the gas hot water supply 15 or the gas meter 17 in the same manner to the manner described in the seventh example.

When a software malfunction of the control section 20 for controlling the wireless base station 19 occurs or a change in the specifications of the control section 20 is needed, the contents of the control section 20 are required to be changed. The contents of the control section 20 are changed by rewriting the control information of the control portion 20a stored in the memory in the control portion 20a or by rewriting the control information of the control portion 20b stored in the memory in the control portion 20b.

It is now assumed that the wireless base station 19 operates in accordance with the control portion 20a. In this case, the rewriting section 22 rewrites the control information of the control portion 20b, not the control portion 20a in operation, based on the change information obtained by the information obtaining section 21. After the rewriting of the control information of the control portion 20b is completed, the rewriting section 22 switches the wireless base station 19, which is currently controlled by the control portion 20a, to be controlled by the control portion 20b at prescribed timing (for example, in response to a reset operation).

The control portion 20b starts operating in accordance with the control information of the control portion 20b rewritten based on the change information. When the rewriting of the control information of the control portion 20b has been completed successfully, the control portion 20b outputs a "prescribed notification signal" to the notification section 29 at the start of the operation of the control portion 20b. When the rewriting of the control information of the control portion 20b has failed, the control portion 20b does not output the "prescribed notification signal" to the notification section 29 at the start of the operation. Such an operation of the control portion 20b is achieved by, for example, inserting an instruction to output the "prescribed notification signal" at a location in a control program which is necessarily executed when the control portion 20b starts operating.

The "prescribed notification signal" can be a signal having a prescribed voltage level, a signal including a rising edge or a signal including a falling edge.

By associating the success or failure in rewriting of the control information of the control portion 20b with presence or absence of the "prescribed notification signal" in this manner, it can be determined whether the rewriting section 22 has succeeded in rewriting the control information of the control portion 20b or not by detecting the presence or absence of the "prescribed notification signal".

The notification section 29 notifies of whether the rewriting section 22 has succeeded in rewriting the control information of the control portion 20b or not (i.e., the rewriting result of the control information of the control portion 20b) to outside the wireless base station 19, based on the presence or absence of the "prescribed notification signal". Similarly, the notification section 29 can notify of the rewriting result of the control information of the control portion 20a to outside the wireless base station 19.

The manner of notifying of the rewriting results of the control information of the control portions 20a and 20b is not limited to any specific manner. The rewriting results may be notified of, for example, by an indicator such as an LED provided on the wireless base station 19 or through a communication to the central station apparatus 24 through the line 23.

The notification section 29 may be integrated with the rewriting section 22. The functions of the notification section 29 and the rewriting section 22 can be realized by, for example, a microcomputer. As in the seventh example, the information obtaining section 21 and the rewriting section 22 may each be integrated with the control portions 20a and 20b.

As described above, the wireless data collection system 1L allows the result (success or failure) of the change in the contents of the control section 20 for controlling the operation of the wireless base station 19 to be notified of to outside the wireless base station 19. Thus, it can be determined whether the change in the contents of the control section 20 is to be re-attempted or not from outside the wireless base station 19.

Thus, the wireless data collection system 1L can be entirely managed at a relatively high reliability.

Example 13

Figure 13:
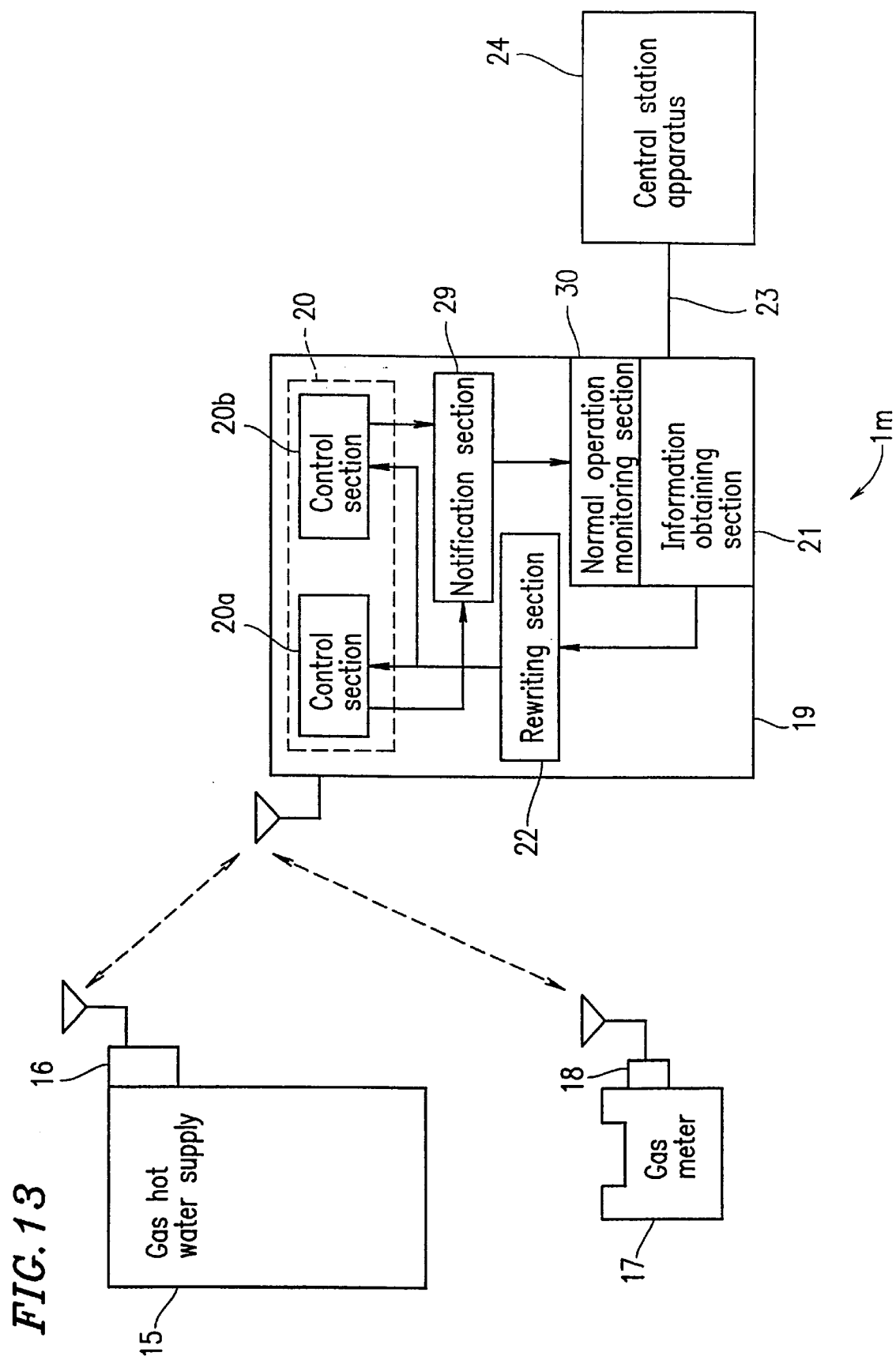
FIG. 13 is a block diagram showing a structure of a wireless data collection system $1m$ in a thirteenth example according to the present invention.

FIG. 13 shows a structure of a wireless data collection system lm in a thirteenth example according to the present invention.

In FIG. 13, identical elements previously discussed with respect to FIG. 12 bear identical reference numerals and the descriptions thereof will be omitted.

As shown in FIG. 13, the wireless base station 19 includes a normal operation monitoring section 30 for monitoring to find whether or not the control section 20 has successfully operated in accordance with the rewritten control information, in addition to the elements shown in FIG. 12.

The central station apparatus 24 collects the data on the gas hot water supply 15 or the gas meter 17 in the same manner to the manner described in the seventh example. The notification section 29 notifies of the rewriting result of the control information of the control portion 20a and the rewriting result of the control information of the control portion 20b in the same manner as the manner described in the twelfth example.

The rewriting section 22 rewrites the control information of the control portion 20b based on the change information obtained by the information obtaining section 21.

As described in the twelfth example, when the rewriting of the control information of the control portion 20b has been successful, the control portion 20b outputs the "prescribed notification signal" to the notification section 29.

The notification section 29 outputs the notification signal output from the control portion 20b to the normal operation monitoring section 30.

Upon receipt of the notification signal from the is notification section 29, the normal operation monitoring section 30 starts counting of a timer (not shown), and sends the notification signal to the central station apparatus 24. The timer is, for example, built in the normal operation monitoring section 30.

The central station apparatus 24 determines whether the notification signal sent from the normal operation monitoring section 30 is the "prescribed notification signal" or not. When the signal is the "prescribed notification signal", the central station apparatus 24 sends a normal rewriting signal indicating the rewriting has been performed normally to the normal operation monitoring section 30 in response to the notification signal.

Upon receipt of the normal rewriting signal from the central station apparatus 24, the normal operation monitoring section 30 stops the counting of the timer.

The rewriting section 22 refers to the value counted by the timer in the normal operation monitoring section 30. When the value exceeds a prescribed value, the rewriting section 22 switches the wireless base station 19, which is currently controlled by the control portion 20b, to be controlled by the control portion 20a. In other words, when the normal operation monitoring section 30 does not receive the normal rewriting signal in response to the notification signal, the rewriting section 22 switches the wireless base station 19 so as to return the operation of the control section 20 to the operation before the change. The reason why the control section 20 is controlled in this manner is that it is determined that the control information of the control portion 20b is rewritten as contents which cannot be communicated with the central station apparatus 24 or that the control information of the control portion 20b is rewritten as incorrect contents.

By switching the wireless base station 19 to be controlled so as to return the operation of the control section 20 to the operation before the change in this manner, the wireless base station 19 is prevented from being made inoperable even when the control information of the control portion 20b is rewritten into contents which cannot be communicated with the central station apparatus 24 or incorrect contents. As a result, the reliability of the wireless base station 19 can be improved.

The normal operation monitoring section 30 may be integrated with the information obtaining section 21. The functions of the normal operation monitoring section 30 and the information obtaining section 21 can be realized by, for example, a microcomputer. As in the seventh example, the information obtaining section 21 and the rewriting section 22 may each be integrated with the control portions 20a and 20b.

As described above, the wireless data collection system 1m allows the result of the change in the contents of the control section 20 for controlling the operation of the wireless base station 19 to be notified of to outside the wireless base station 19. When a prescribed response to the notification is not obtained, the operation of the control section 20 is returned to the previous operation.

Thus, the wireless data collection system 1m can be entirely managed at a relatively high reliability.

Example 14

Figure 14:
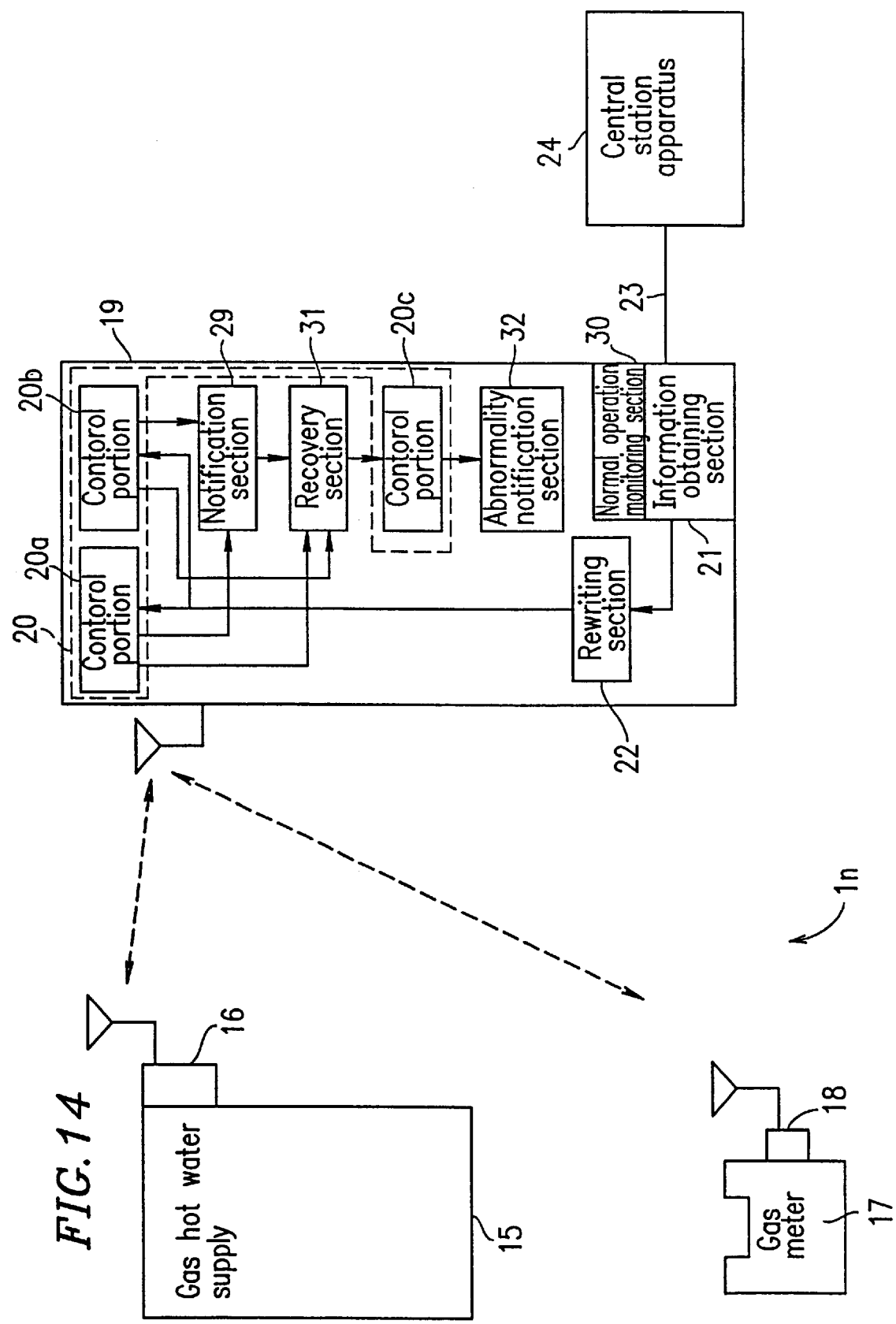
FIG. 14 is a block diagram showing a structure of a wireless data collection system $1n$ in a fourteenth example according to the present invention.

FIG. 14 shows a structure of a wireless data collection system 1n in a fourteenth example according to the present invention.

In FIG. 14, identical elements previously discussed with respect to FIG. 13 bear identical reference numerals and the descriptions thereof will be omitted.

As shown in FIG. 14, the wireless base station 19 includes a control portion 20c for controlling the wireless base station 19 when neither the control portion 20a nor the control portion 20b operates normally, a recovery section 31 for changing the control portion for controlling the wireless base station 19, and an abnormality notification section 32 for notifying the central station apparatus 24 that the wireless base station 19 operates in accordance with the control portion 20c, in addition to the elements shown in FIG. 13.

The central station apparatus 24 collects the data on the gas hot water supply 15 or the gas meter 17 in the same manner to the manner described in the seventh example. The notification section 29 notifies of the rewriting result of the control information of the control portion 20a and the rewriting result of the control information of the control portion 20b in the same manner as the manner described in the thirteenth example. The normal operation monitoring section 30 monitors to find whether or not the control section 20 has successfully operated in accordance with the rewritten control information in the same manner as the manner described in the thirteenth example.

As described in the thirteenth example, the normal operation monitoring section 30 starts counting of the timer upon receipt of the notification signal from the notification section 29, and stops the counting of the timer upon receipt of the normal rewriting signal from the central station apparatus 24.

It is now assumed that the value counted by the timer in the normal operation monitoring section 30 exceeds a prescribed value. In this case, the rewriting section 22 switches the wireless base station 19 currently controlled by the control portion 20b to be controlled by the control portion 20a, since it is determined that the control portion 20b does not operate normally.

In the case where the control portion 20a does not operate normally for some reason, and the control portion 20b does not operate normally, the wireless base station 19 does not operate normally. In such a case, the control portion 20a or the control portion 20b notifies the recovery section 31 of that situation. The notification section 29 notifies the recovery section 31 that the control portion for controlling the wireless base station 19 has been changed.

When the recovery section 31 determines that neither the control portion 20a nor the control portion 20b operates normally based on the information from the control portion 20a or 20b and the information from the notification section 29, the recovery section 31 switches the wireless base station 19 to be controlled by the control portion 20c.

In a memory (not shown) in the control portion 20a, the minimum necessary control information for communication between the wireless base station 19 and the central station apparatus 24 is stored in advance. The "minimum necessary control information" is, for example, the minimum necessary control information for sending the change information from the central station apparatus 24 to the wireless base station 19.

The control information of the control portion 20a is set to be unchangeable from outside the wireless base station 19. When the control portion 20c recognizes that the control portion 20a itself is to control the wireless base station 19 based on the information from the recovery section 31, the control portion 20a notifies of that to the abnormality notification section 32.

The abnormality notification section 32 receives the information from the control portion 20c, and notifies the central station apparatus 24 that the wireless base station 19 is controlled by the control portion 20c since neither the control portion 20a nor the control portion 20b operates normally.

The central station apparatus 24 receives the information from the abnormality notification signal 32 of the wireless base station 19, and sends new change information to the wireless base station 19.

The information obtaining section 21 receives the new change information from the central station apparatus 24 and outputs the new change information to the rewriting section 22.

The rewriting section 22 rewrites the control ° information of the control portion 20a or 20b based on the new change information in the manner described in the seventh example.

Thus, even when neither the control portion 20a nor 20b operates normally for some reason, the control portion 20c can be utilized to prevent the wireless base station 19 from being made inoperable.

Since the abnormality notification section 32 notifies the central station apparatus 24 that neither the control portion 20a nor 20b operates normally, new change information can be downloaded from the central station apparatus 24.

Thus, the wireless data collection system 1n can improve the reliability of the wireless base station 19 and the entirety of the wireless data collection system in itself.

The recovery section 31 and the abnormality notification section 32 may each be integrated with the information obtaining section 21. The functions of the recovery section 31, the abnormality notification section 32 and the information obtaining section 21 can be realized by, for example, a microcomputer. As in the thirteenth example, the information obtaining section 21 and the rewriting section 22 may each be integrated with the control portions 20a and 20b.

Example 15

Figure 15:
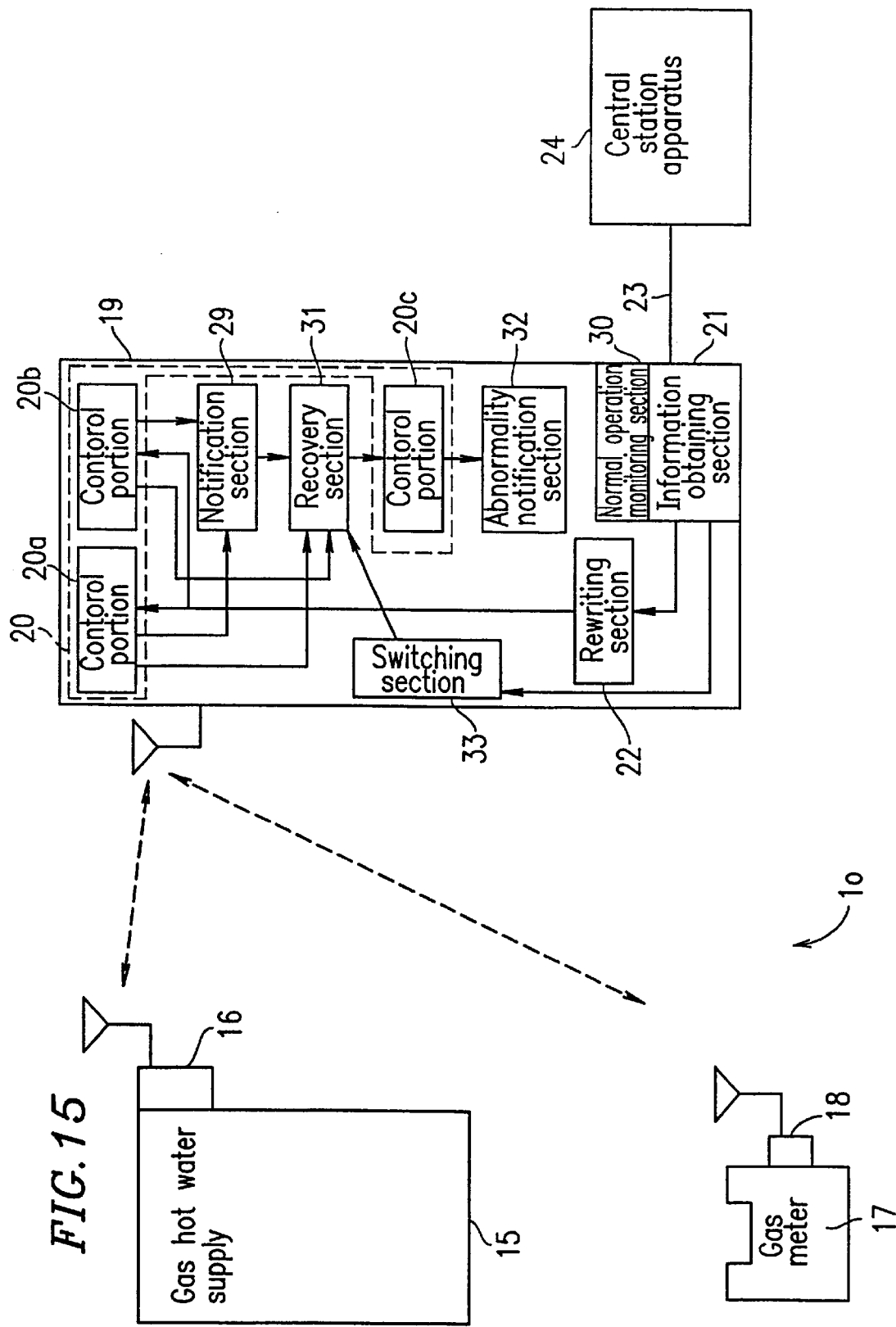
FIG. 15 is a block diagram showing a structure of a wireless data collection system $1o$ in a fifteenth example according to the present invention.
Figure 16:
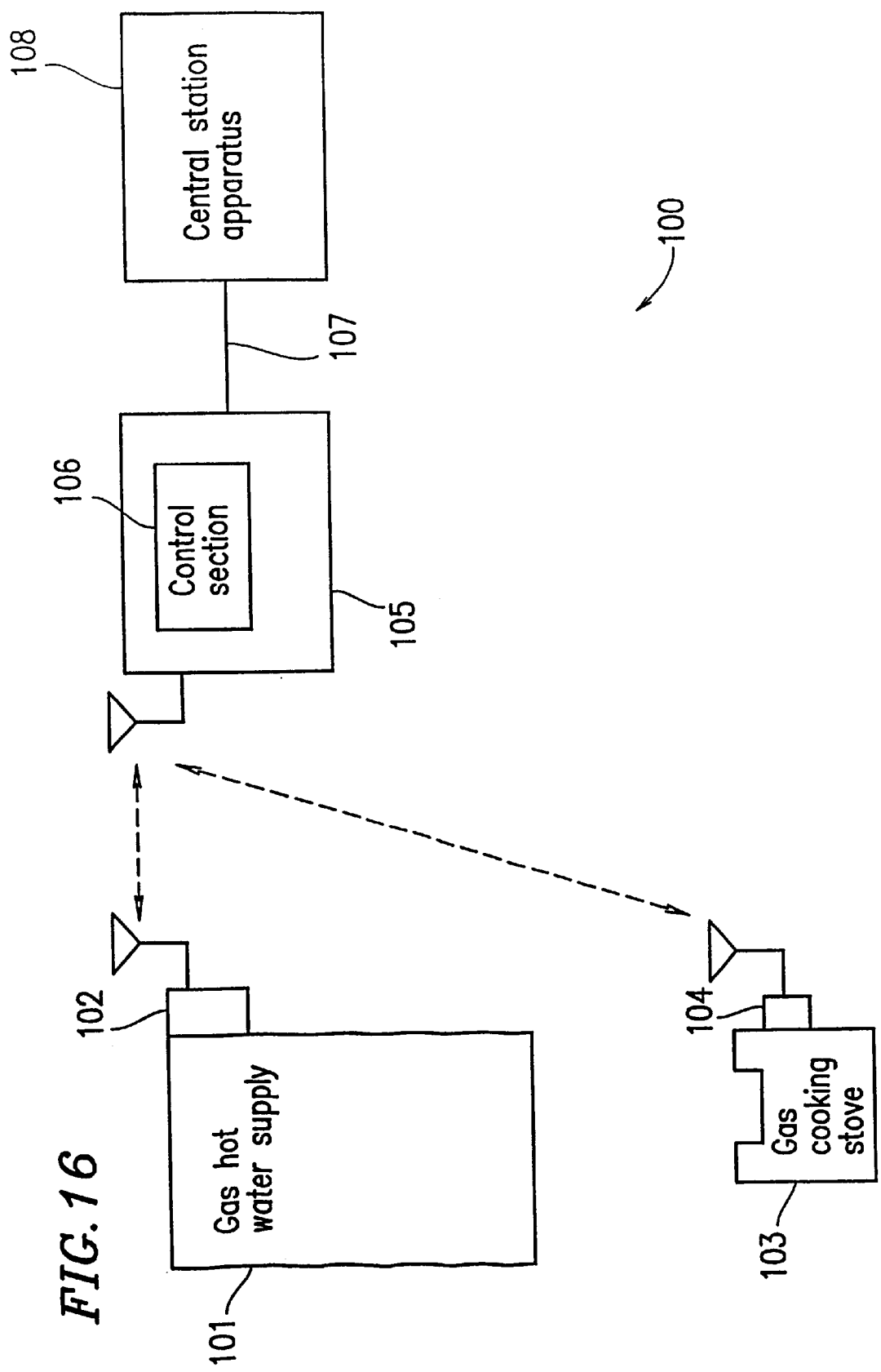
FIG. 16 is a block diagram showing a structure of a conventional wireless data collection apparatus 100.

FIG. 15 shows a structure of a wireless data collection system 1o in a fifteenth example according to the present invention.

In FIG. 15, identical elements previously discussed with respect to FIG. 14 bear identical reference numerals and the descriptions thereof will be omitted.

As shown in FIG. 15, the wireless base station 19 includes a switching section 33 for switching the wireless base station 19 to be controlled by the control portion 20a, in addition to the elements shown in FIG. 14.

The central station apparatus 24 collects the data on the gas hot water supply 15 or the gas meter 17 in the same manner to the manner described in the seventh example. The control portion 20c is utilized when neither the control portion 20a nor 20b operates normally in the same manner as the manner described in the fourteenth example.

It is now assumed that while the wireless base station 19 operates in accordance with the control portion 20a or 20b, an incident occurs in which the wireless base station 19 and the central station apparatus 24 are not communicated normally with each other for some reason.

As described in the fourteenth example, the control portions 20a and 20b each have a function of switching the wireless base station 19 to be controlled by a different control device when the control portion 20a or 20b itself does not operate normally.

Such switching of the control device is performed in the case where the control portion 20a or 20b does not operate normally when the operation of the control portion 20a or 20b is confirmed immediately after the contents of the control portion 20a or 20b are changed by the central station apparatus 24. However, such switching of the control device is not performed in the case where the control portion 20a or 20b operates normally when the operation of the control portion 20a or 20b is confirmed immediately after the contents of the control portion 20a or 20b are changed by the central station apparatus 24. In the case where, for example, the control portion 20a or 20b malfunctions while the central station apparatus 24 is in normal communication with the wireless terminal 16 or 18, the control portion for controlling the wireless base station 19 cannot be switched in the above-described manner. Such a problem is solved by rewriting the contents of the control portion 20a or 20b by the central station apparatus 24. However, when an incident where the wireless base station 19 and the central station apparatus 24 cannot be in normal communication with each other occurs for some reason, there can be an undesirable case where even when the change information is sent from the central station apparatus 24 to the wireless base station 19, the change information cannot be received by the wireless base station 19.

In the fifteenth example, the central station apparatus 24 sends a signal to the wireless base station 19 to indicate that the wireless base station 19 is to be forcibly switched to be controlled by the control portion 20c.

Upon receiving the signal from the central station apparatus 24, the information obtaining section 21 outputs the contents of the signal to the rewriting section 22 and the switching section 33.

Upon receiving the signal from the information obtaining section 21, the switching section 33 reads the contents of the signal. When the signal indicates that the wireless base station 19 is to be forcibly switched to be controlled by the control portion 20a, the switching section 33 utilizes the recovery section 31 to forcibly switch the wireless base station 19 to be controlled by the control portion 20c. In this manner, even when none of the rewriting section 22, the control portion 20a or the control portion 20b operates normally, the switching section 33 forcibly operates the recovery section 31 to switch the wireless base station 19 to be controlled by the control portion 20c. As a result, the operation of the wireless base station 19 is guaranteed by the control portion 20c.

Thus, even when neither the control portion 20a or the control portion 20b operates normally for some reason and in addition the communication between the wireless base station 19 and the central station apparatus 24 is not performed normally, the control portion 20c can be utilized to avoid the wireless base station 19 from being made inoperable.

By notifying the central station apparatus 24 that neither the control portion 20a nor the control portion 20b operates normally by the abnormality notification section 32, the new change information can be downloaded to the wireless base station 19 from the central station apparatus 24.

Thus, the wireless data collection system 1o can improve the reliability of the wireless base station 19 and the entirety of the wireless data collection system 1o itself.

The recovery section 31, the abnormality notification section 32 and the switching section 33 may each be integrated with the information obtaining section 21. The functions of the recovery section 31, the abnormality notification section 32, the switching section 33 and the information obtaining section 21 can be realized by, for example, a microcomputer. As in the fourteenth example, the information obtaining section 21 and the rewriting section 22 may each be integrated with the control portions 20a and 20b.

INDUSTRIAL APPLICABILITY

A wireless data collection system according to the present invention can change the contents of the control portion for controlling the operation of the wireless base station from outside the wireless base station. Thus, a malfunction of the control section or a need to change the specifications of the control section can be dealt with without replacing the wireless base station itself. As a result, the wireless data collection system according to the present invention has an effect of collecting various data on a housing apparatus without causing any inconvenience on even when a malfunction of the apparatus occurs or a change in specifications of the apparatus is needed.

What is claimed is:

1. A wireless data collection system, comprising:
    a wireless terminal provided for an apparatus;
    a wireless base station for communicating with the wireless terminal through a wireless communication to collect data on the apparatus; and
    a central station apparatus for communicating with the wireless base station through a line,
    wherein:
    the wireless base station includes:
        a control section for controlling an operation of the wireless base station,
        an information obtaining section for obtaining change information for changing an operation of the control section from outside the wireless base station, and
        a rewriting section for rewriting control information defining the operation of the control section based on the change information, wherein the wireless base station further includes a signal detection section for detecting a signal indicating timing at which the information obtaining section is to obtain the change information, and the information obtaining section starts obtaining the change information in response to detection of the signal by the signal detection section.

2. A wireless data collection system according to claim 1, wherein the information obtaining section obtains the change information from the central station apparatus.

3. A wireless data collection system according to claim 1, wherein the wireless base station further includes a rewriting amount determination section for determining whether the control information is to be rewritten partially or entirely based on the change information, and the rewriting section rewrites the control information based on a determination result of the rewriting amount determination section.

4. A wireless data collection system according to claim 1, wherein the wireless base station further includes a storage section for temporarily storing the control information before the rewriting section rewrites the control information; and when the rewriting section fails in rewriting the control information, the control section operates in accordance with the control information stored in the storage section.

5. A wireless data collection system according to claim 1, wherein the wireless base station further includes a notification section for notifying of a rewriting result of the control information to outside the wireless base station.

6. A wireless data collection system, comprising:
    a wireless terminal provided for an apparatus:
    a wireless base station for communicating with the wireless terminal through a wireless communication to collect data on the apparatus; and
    a central station apparatus for communicating with the wireless base station through a line,
    wherein:
    the wireless base station includes:
        a control section for controlling an operation of the wireless base station,
        an information obtaining section for obtaining change information for changing an operation of the control section from outside the wireless base station, and
        a rewriting section,
        wherein:
            the control section includes a first control portion and a second control portion, and
            the rewriting section rewrites at least one of first control information defining an operation of the first control portion and second control information defining an operation of the second control portion, based on the change information.

7. A wireless data collection system according to claim 6, wherein the wireless base station further includes a storage section for temporarily storing the change information obtained by the information obtaining section, and the rewriting section rewrites the control information based on the change information only when the information obtaining section has successfully obtained the change information.

8. A wireless data collection system according to claim 6, wherein the wireless base station further includes a rewriting range determination section for determining whether only the first control information is to be rewritten, only the second control information is to be rewritten, or both of the first control information and the second control information are to be rewritten; and the rewriting section rewrites at least one of the first control information and the second control information based on a determination result of the rewriting range determination section.

9. A wireless data collection system according to claim 6, wherein the wireless base station further includes an operation determination section for determining whether the wireless base station is to operate in accordance with the first control portion or the second control portion, and the wireless base station operates in accordance with whichever of the first control portion and the second control portion determined by the operation determination section.

10. A wireless data collection system according to claim 6, wherein the wireless base station further includes a storage section for storing information indicating whether the wireless base station is in operation in accordance with the first control portion or the second control portion.

11. A wireless data collection system according to claim 6, wherein the wireless base station further includes a notification section for outputting a notification signal notifying of a rewriting result of the first control information and a rewriting result of the second control information.

12. A wireless data collection system according to claim 11, wherein the wireless base station further includes a normal operation monitoring section for starting counting of a timer upon receiving the notification signal output by the notification section and stopping the counting of the timer upon receiving a signal sent from the central station apparatus in response to the notification signal, and the rewriting section returns the operation of the control section to the operation before the change by the timer.

13. A wireless data collection system according to claim 12, wherein:
    the control section further includes a third control portion for controlling minimum necessary communication between the wireless base station and the central station apparatus, and
    the wireless base station further includes a recovery section for detecting that neither the first control portion nor the second control portion operates normally based on information from the normal operation monitoring section, and switching the wireless base station to be controlled by the third control portion.

14. A wireless data collection system according to claim 13, wherein the wireless base station further includes a switching section for switching the wireless base station to be controlled by the third control portion in response to a signal from the central station apparatus.

* * * * *